United States Patent
Shimizu

Patent Number: 5,905,911
Date of Patent: May 18, 1999

[54] DATA TRANSFER SYSTEM WHICH DETERMINES A SIZE OF DATA BEING TRANSFERRED BETWEEN A MEMORY AND AN INPUT/OUTPUT DEVICE

[75] Inventor: Toshiyuki Shimizu, Yokohama, Japan

[73] Assignee: Fujitsu Limited, Kawasaki, Japan

[21] Appl. No.: 08/927,207

[22] Filed: Sep. 11, 1997

Related U.S. Application Data

[63] Continuation of application No. 08/397,722, Mar. 2, 1995, abandoned, which is a continuation of application No. 07/724,185, Jul. 1, 1991, abandoned.

[30] Foreign Application Priority Data

Jun. 29, 1990 [JP] Japan ................................. 2-170292

[51] Int. Cl.$^6$ .................................................. G06F 13/00
[52] U.S. Cl. ............................................................ 395/842
[58] Field of Search ............................................. 395/842

[56] References Cited

U.S. PATENT DOCUMENTS

| | | | |
|---|---|---|---|
| 4,346,439 | 8/1982 | Huno et al. | 395/425 |
| 4,471,427 | 9/1984 | Harris | 395/425 |
| 4,797,851 | 1/1989 | Suzuki | 395/425 |
| 5,062,073 | 10/1991 | Masuda et al. | 395/400 |
| 5,170,477 | 12/1992 | Potter et al. | 395/425 |

FOREIGN PATENT DOCUMENTS

| | | |
|---|---|---|
| 62-14541 | 1/1987 | Japan . |
| A 63-198143 | 8/1988 | Japan . |

*Primary Examiner*—David L. Robertson
*Attorney, Agent, or Firm*—Staas & Halsey

[57] ABSTRACT

A data transfer system which improves efficiency in direct data transfer from an input device with a first-in first-out (FIFO) memory serving as a buffer to a memory and from a memory to an output device with a first-in first-out (FIFO) memory serving as a buffer. The data is transferred from the input device to the memory and from the memory to the output device by meeting the requirement of address alignment without restricting data transfer to fixed multiples of, for example, four words. A memory write controller is informed as to how much data is present in the buffer in the input device. The controller checks memory address alignment to determine the transfer size of data from the input device to the memory. A memory read controller is also informed as to how much free space is present in the buffer in the output device and checks the memory address alignment to determine the transfer size of data from the memory to the output device. The request lines from the input device are used to indicate that data in the FIFO is either one word or more, two words or more or four words or more. A maximum data transfer size is determined automatically from an amount of data stored in the buffer of the input device and a check on memory address alignment.

28 Claims, 22 Drawing Sheets

| 0 | 4 | 8 | 12 |
| 16 | 20 | 24 | 28 |
| 32 | 36 | 40 | 44 |
| . | . | . | . |

Fig. 2

| TRANSFER SIZE | TRANSFERABLE ADDRESS ALIGNMENT | NUMBERS OF CYCLES REQUIRED TO TRANSFER |
| --- | --- | --- |
| 1-BYTE R/W | POSSIBLE WITH ANY ADDRESS VALUE | 3 CYCLE |
| 2-BYTE R/W | A[0] = 0 | 3 CYCLE |
| 1-WORD R/W | A[1:0] = 0 | 3 CYCLE |
| 2-WORD R/W | A[2:0] = 0 | 4 CYCLE |
| 4-WORD R/W | A[3:0] = 0 | 6 CYCLE |

| BUFFER STATUS | | | | DECISION LOGIC | |
|---|---|---|---|---|---|
| 1 | 2 | 3 | 4 | 5 | 6 | 7 | 8 |
| 0 | 0 | 0 | 0 | 1(1) | 2(2) | 3(2) | 4(4) | 4 |
| 0 | 0 | 0 | 1(1) | 2(2) | 3(2) | 4(4) | 5(4) | 3 |
| 0 | 0 | 1(1) | 2(2) | 3(2) | 4(4) | 5(4) | 6(4) | 2 |
| 0 | 1(1) | 2(2) | 3(2) | 4(4) | 5(4) | 6(4) | 7(4) | 1 |

REMAINDER SIZE

DATA TRANSFER SYSTEM WHICH DETERMINES A SIZE OF DATA BEING TRANSFERRED BETWEEN A MEMORY AND AN INPUT/OUTPUT DEVICE

This application is a continuation of application Ser. No. 08/397,722, filed Mar. 2, 1995, which is a continuation of prior application Ser. No. 07/724,185, filed on Jul. 1, 1991, both now abandoned.

BACKGROUND OF THE INVENTION

1. Field of the invention

The present invention relates to a data transfer system for use in a computer system and, more particularly, to a data transfer system for performing direct data transfer efficiently from an input device having a first-in first-out (FIFO) memory, serving as a buffer, to a memory and from a memory to an output device having a first-in first-out (FIFO) memory serving as a buffer.

2. Description of the Related Art

Recent speeding-up and up-sizing of computer systems have enabled very big problems to be treated. Quantities of data to be treated have consequently become huge. Thus, the performance of computer systems is frequently influenced by input/output data rate. In a system configuration such as a parallel computer, large quantities of data are transferred between computing elements for information interchange.

In order to realize a high-speed computer system, it is required to input and output data faster and more efficiently than before.

In computer systems, direct memory access (DMA) systems are now widely used for direct data transfer between a memory and an input/output device without intervention of a central processing unit.

FIG. 1 (PRIOR ART) is a block diagram of a related art processor system using the DMA system. In this processor system, data is transferred from an input device 1 to a memory system 2 and from the memory system 2 to an output device 3 via a common bus 4 under the control of a direct memory access controller (DMAC) 5. A processor 6 is connected to the common bus 4 to control the entire system. The input device 1 is equipped with a first-in first-out (FIFO) memory 7 for storing input data and the output device 3 is equipped with a first-in first-out (FIFO) memory 8 for storing output data.

In FIG. 1, a request line ① becomes active when data is present at the FIFO 7 of the input device 1, so that a request for transfer is sent to the DMAC 5. The DMAC 5 renders a memory write line ③ and a memory read line ② active for data transfer. When there is free space in the FIFO 8 of the output device 3, a request line ④ becomes active, so that a request for transfer is sent to the DMAC 5. The DMAC 5 renders a memory read line ⑥ and a write line ⑤ active, so that data is transferred from the memory system 2 to the output device 3. The size of a unit of such data transfer is generally determined at the time of the initialization of the DMAC 5. For this reason, even if any number of pieces of data are present in the FIFO 7 of the input device 1 or any amount of free space is present in the FIFO 8 in the output device 3, data transfer is effected in a transfer unit the size of which was determined initially.

It is usual that, in realizing a memory system, transferable data sizes vary with access addresses of a memory and thus data transfer rates vary correspondingly. FIG. 2 (PRIOR ART) illustrates an example of a memory. In the Figure, one rectangular area represents 1-word data (4 bytes) storage area and digits within the rectangles represent addresses represented in decimal notation for simplicity.

In FIG. 2, four words can be transferred only from access addresses of 0, 16, 32, etc., and two words can be transferred from access addresses of 0, 8, 16, etc., but cannot be transferred from addresses 4, 12, etc. That transferable sizes of data vary with memory access addresses as described above is referred herein that the memory has address alignment.

FIG. 3 (PRIOR ART) illustrates specific examples of reading and writing properties of a memory system connected to a bus which is one word (four bytes) wide. In the Figure, there are shown transferable address alignment for 1-byte, 2-byte, 1-word, 2-word and 4-word data and the numbers of cycles required to transfer data of such sizes. Note that A[X:Y] represents values of bits X to Y of an address.

The transfer of 1-byte data is possible with any address value and requires three cycles. The transfer of two-byte data is possible only when the 0 bit, or the low-order bit of an access address is 0 and requires three cycles.

The transfer of one-word data is possible only when the 0 and 1 bits, or the two low-order bits of an access address are 0s and requires three cycles. The transfer of four-word data is possible only when the four low-order bits of an access address are all 0s and requires six cycles. For example, if four-word data were transferred word by word, the number of cycles required would be 12. If, however, four words were transferred at a time, the number of cycles required would be six as described above.

In the related art described in connection with FIG. 1, the data size for transfer is previously determined. In order to transfer data most efficiently with as little a common-bus occupation time as possible, it is required to transfer data in a four-word unit with the reduced number of cycles indicated in FIG. 3. In this case, however, there are two conditions that address alignment must be correct and data must be transferred in multiples of four words. It is difficult to meet the two conditions for data transmission.

SUMMARY OF THE INVENTION

It is an object of the present invention to provide a data transmission system which improves efficiency in data transfers from an input device to a memory and from a memory to an output device without meeting the two conditions of address alignment and transfer of data in multiples of, for example, four words.

A feature of the present invention resides in a data transfer system for use with a direct memory access system for direct data transfer between a memory and an input/output device, comprising a memory in which the transferred sizes of data vary with accessed addresses; an input device, connected to the memory by a common bus, and having a buffer for storing input data to the memory, and for outputting on the common bus an amount of input data stored in the buffer; and memory write control means for determining a transfer size of data in accordance with the amount of input data output from the input device and an access address of the memory, and controlling the transfer of data of the transfer size from the input device to said memory.

BRIEF DESCRIPTION OF THE DRAWINGS

Figure 2:
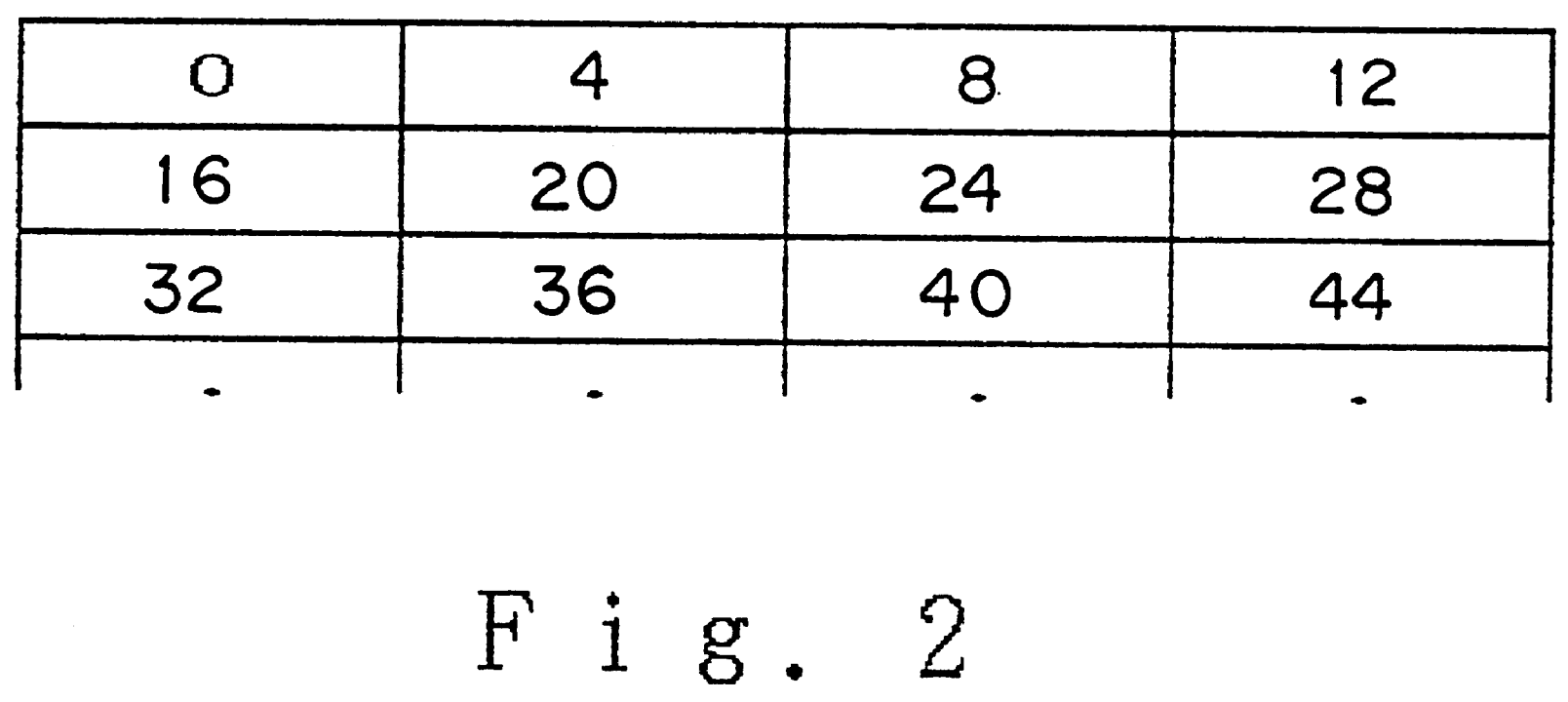

FIG. 2 (PRIOR ART) illustrates an example of a memory having address alignment;

FIG. 3 (PRIOR ART) illustrates properties of reading from and writing into a memory system;

FIG. 22 is a decision logic table of DMA request from Buffer status and access size currently performed.

DETAILED DESCRIPTION OF THE PREFERRED EMBODIMENTS

Figure 4:
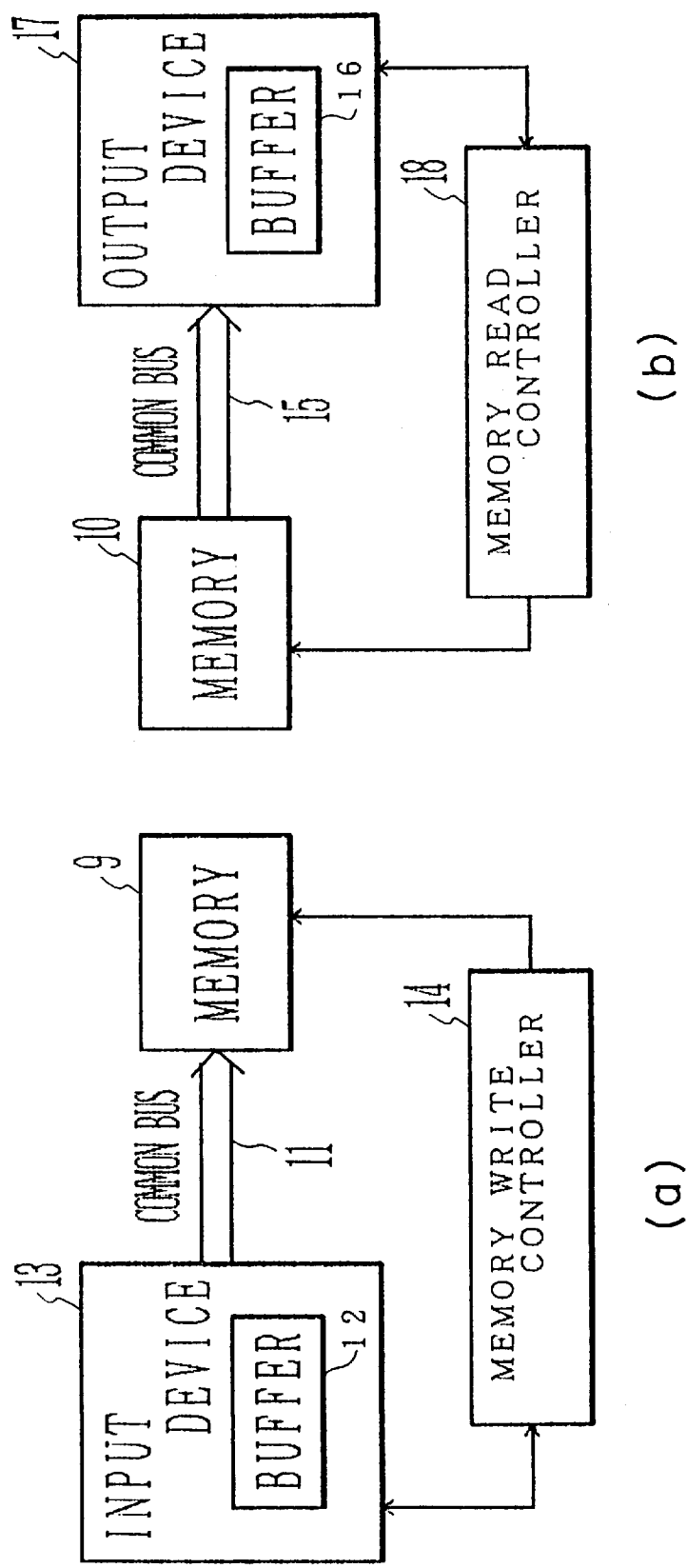
FIGS. 4A and 4B are basic block diagrams of the present invention.

A principle of the present invention is shown in FIGS. 4A and 4B.

FIGS. 4A and 4B are basic block diagrams of a data transfer system using a direct memory access system for direct data transfer between a memory and an input/output device. More specifically, FIG. 4A is a basic block diagram of a first embodiment of the present invention in which data is transferred from an input device to a memory.

A memory 9 has transferable data sizes varying with accessed addresses, that is, it is a memory having the address alignment described above.

An input device 13, which is connected to the memory 9 by a common bus 11, is provided with a buffer for storing input data which is transferred to the memory 9, for example, a first-in first-out (FIFO) memory 12. The storage amount of input data stored in the buffer 12 is output to a memory write controller 14 which will be described later.

The memory write controller 14 is, for example, a direct memory access controller (DMAC), which makes a check on, for example, the above-described address alignment in accordance with a quantity of input data output from the input device 13 and an address for accessing the memory 9 to thereby determine the size of data to be transferred and controls the transfer of data of such transfer size from the input device 13 to the memory 9.

FIG. 4B is a basic block diagram of a data transfer system according to a second embodiment of the present invention, in which data is transferred from a memory to an output device. A memory 10 is a memory in which transferable data sizes vary with access addresses. An output device 17, like the input device 13, is connected to a memory 10 by a common bus 15 and has a buffer for storing output data transferred from the memory 10, for example, a first-in first-out (FIFO) memory 16. The amount of free storage space in the buffer 16 is output to a memory read controller 18.

The memory read controller 18 checks the address alignment of the memory 10 on the basis of the amount of free storage space in the buffer, output from the output device 17 and on the basis of an access address of the memory 10 to thereby determine the transfer size of data, and controls the transfer of data of such a transfer size from the memory 10 to the output device 17. Only when the amount of free storage space exceeds the transfer size, the transfer of data occurs.

A third embodiment of the present invention is the same as the embodiment shown in FIG. 4A in configuration. The memory write controller 14 determines the data transfer size in accordance with the stored amount of input data to be output from the input device, an access address to the memory, and a remaining amount of the transfer data, and then controls the transfer of data of such size from the input device to the memory. The transfer of the data occurs only when the stored amount of data exceeds the transfer size.

A fourth embodiment of the present invention has the same configuration as shown in FIG. 4B. The memory read controller determines a data transfer size in accordance with a buffer free space amount output from the output device, a memory access address, and an amount of transfer data remaining untransferred, and controls the transfer size of the transfer of data from the memory to the output device.

In the first embodiment, the memory write controller 14 is informed of how much data is present in the buffer 12 of the input device 13 and checks the address alignment of the memory to determine a transfer size of data to be transferred from the input device 13 to the memory 9. In the second embodiment, the memory read controller 18 finds an amount of free space in the buffer, for example, the FIFO 16 of the output device 17 and checks the address alignment of the memory to determine a transfer size of data from the memory 10 to the output device 17.

A plurality of request lines are connected between the input device 13 and the write controller 14 and between the output device 17 and the memory read controller 18. For example, the request lines connected to the input device 13 are used to represent corresponding amounts of data in its FIFO, such as one word or more, two words or more and four words or more.

In the third and fourth embodiments, an amount of the rest of transfer data i.e. a remaining transfer data is decided first. A transfer size is determined from the amount of the rest of transfer data and the address alignment. The transfer is performed only when the data can be transferred in the transfer size. In the third embodiment, the transfer is performed when there exists an amount of data which can be transferred to the buffer. In the fourth embodiment, the transfer of data is performed when the buffer has enough free space to store the data.

As described above, according to the present invention, a data transfer size is determined automatically to maximize the transfer efficiency in accordance with an amount of data stored in the buffer of, for example, the input device and a check on memory address alignment.

Figure 1:
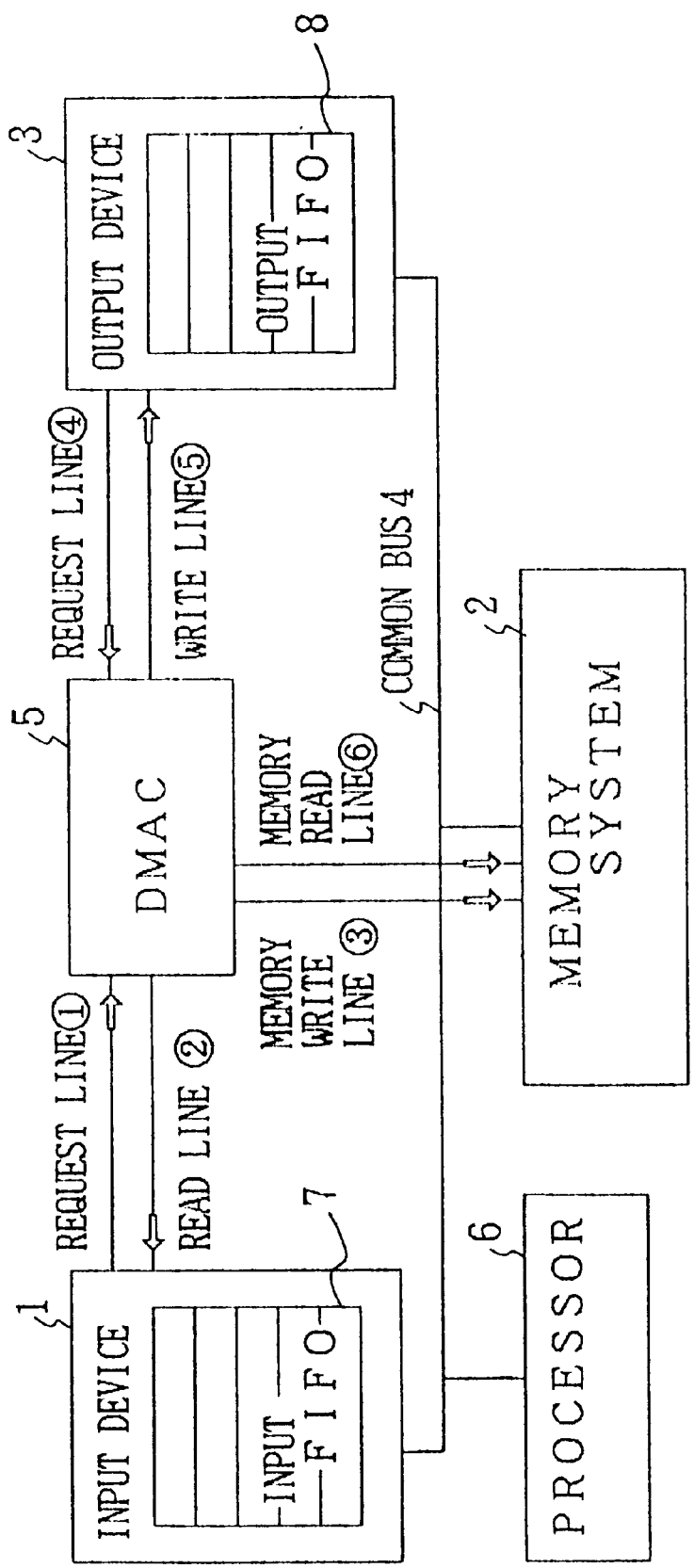
FIG. 1 (PRIOR ART) illustrates a related art processor system using a DMA system.
Figure 5:
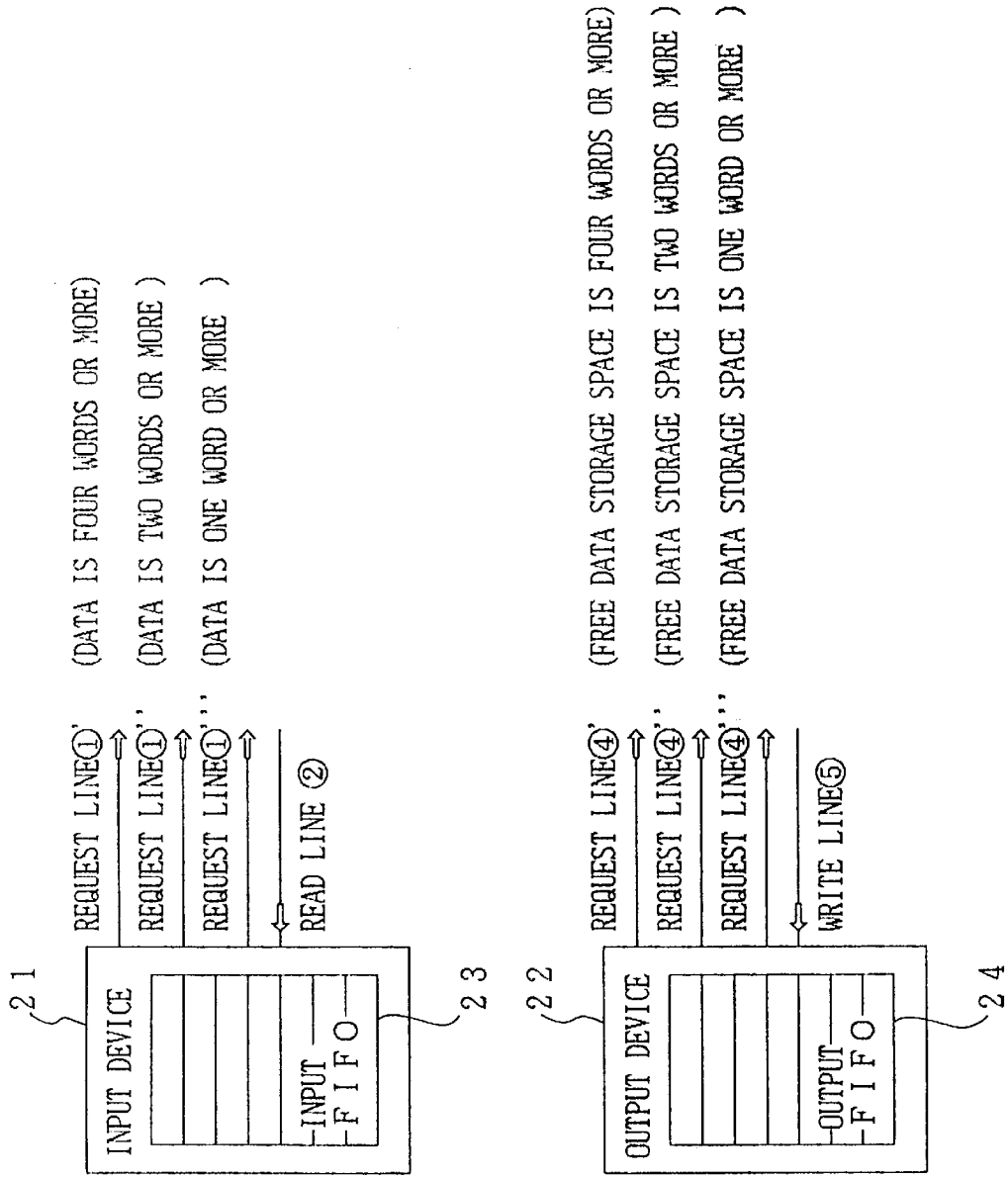
FIG. 5 illustrates configurations of request lines from the input and output devices to the direct memory access controller of FIG. 4A and FIG. 4B.

Referring now to FIG. 5, there are illustrated request lines from an input device 21 to a direct memory access controller (DMAC) and request lines from an output device 22 to the DMAC. The configuration of a processor system is the same as the prior art system shown in FIG. 1 except that a plurality of request lines are connected from each of the input and output devices to the DMAC and the DMAC operates in response to each of these request lines.

In FIG. 5, three request lines from the input device 21 are adapted to inform the DMAC that the quantity of data stored in an input FIFO 23 in the input device 21 is either one word or more, two words or more or four words or more. Three request lines from the output device 22 are adapted to inform the DMAC that the quantity of free data storage space in an output FIFO 24 is either one word or more, two words or more, or four words or more. These request lines are adapted to the case where either one word, two words or four words can be employed as a data transfer unit. However, it is natural that other data transfer units can be employed.

Figure 6:
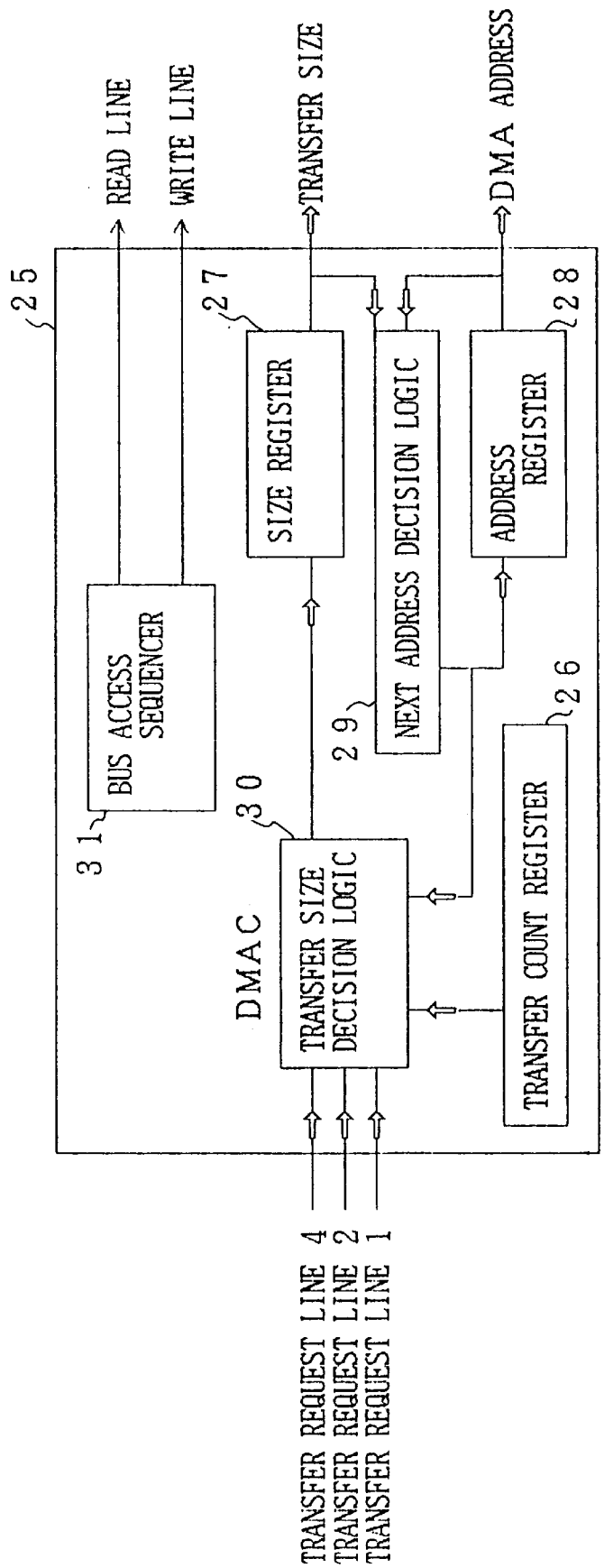
FIG. 6 is a block diagram of the direct memory access controller (DMAC) of FIG. 4A and FIG. 4B.

FIG. 6 is a block diagram of the direct memory access controller (DMAC). In the Figure, a transfer count register 26 is adapted to check whether or not all data in one block has been transferred. More specifically, if, for example, ten words constitute one block, the transfer count register holds the number of transferable words within one block which remain untransferred, e.g., two words if eight words have already been transferred. A size register 27 temporarily holds a data transfer size output from a transfer size decision logic 30 to be described later. An address register 28 temporarily holds a DMA address. Each of the size register 27 and the address register 28 holds data for one bus cycle.

Next address decision logic 29 adds a data transfer size output from the size register 27 and a DMA address output from the address register 28, thereby deciding the next memory access address. Transfer size decision logic 30 decides a data transfer size in accordance with the number of transferable words remaining untransferred which is held by the transfer count register 26, a signal on a transfer request line from the input device or the output device which represents respectively the stored amount of input data or the amount of free storage space in the buffer and a next memory address output from the next address decision logic 29. The transfer size is output to the size register 27.

The direct memory access controller 25 is also provided with a bus access sequencer 31 which outputs a read signal and a write signal onto a read line and a write line, respectively, and controls reading from the input device 21 and writing into the output device 22.

Figure 7:
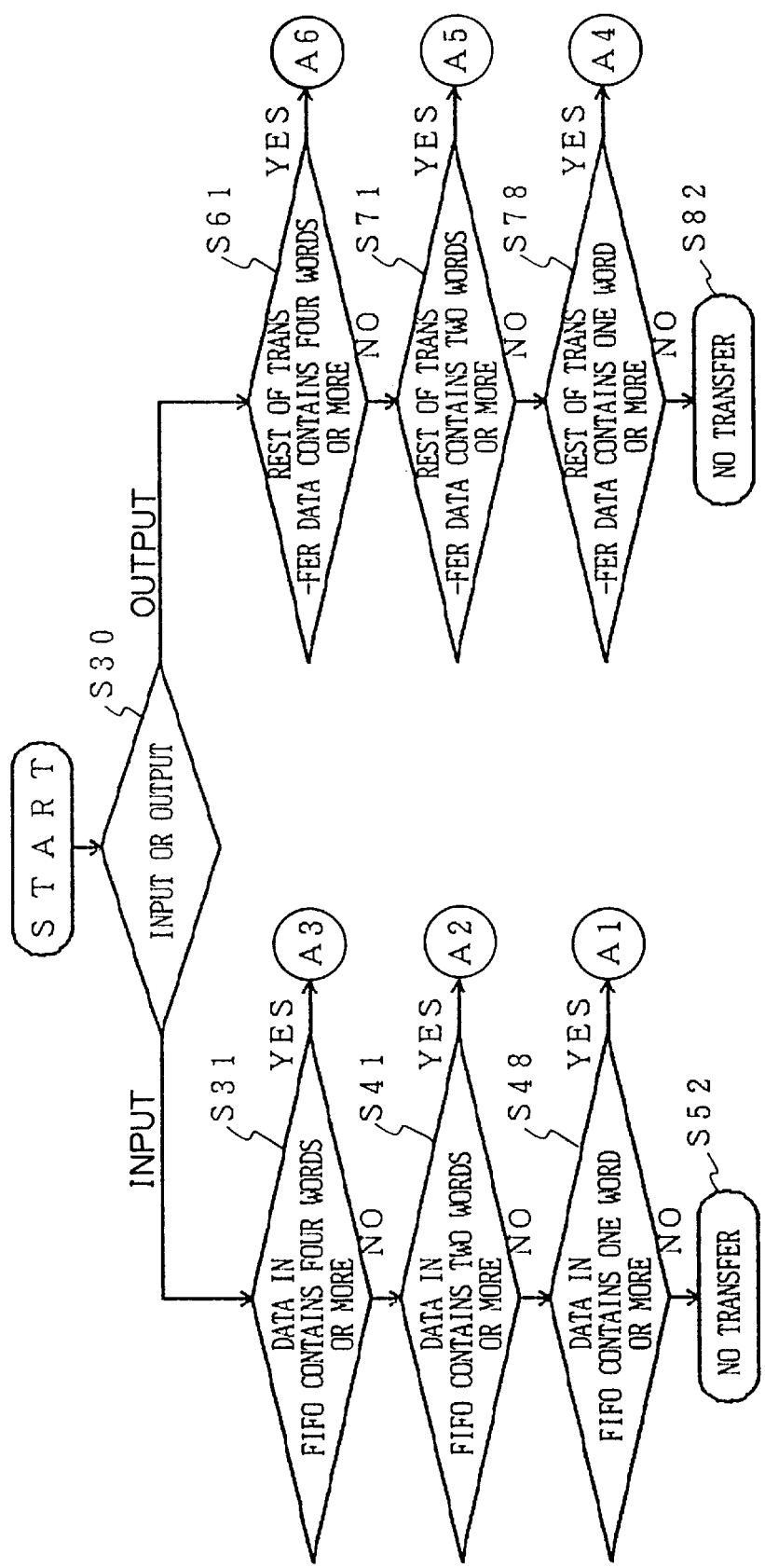
FIGS. 7, 8 and 9 are a flowchart of a transfer size decision process.

FIG. 7 is a flowchart of the process performed by the transfer size decision logic 30 of the direct memory access controller (DMAC). When the process is started, either the case of data input to the memory or the case of data output from the memory is decided first in step S30. In the case of data input to the memory, a decision is made in step S31 as to whether or not data stored in the input FIFO 23 of the input device 21 contains four words or more. In the case of four words or more, a decision is made in step S32 (FIG. 9) as to whether or not the rest of transfer data in one block contain four words or more.

In the case of four words or more, the address alignment is checked to decide whether or not the transfer of four words is possible in step S33. That is, as described in connection with FIG. 3, a decision is made as to whether or not the four low-order bits of a memory access address are all 0s. When they are all 0s (YES), the transfer of four words is decided in step S34.

Figure 8:
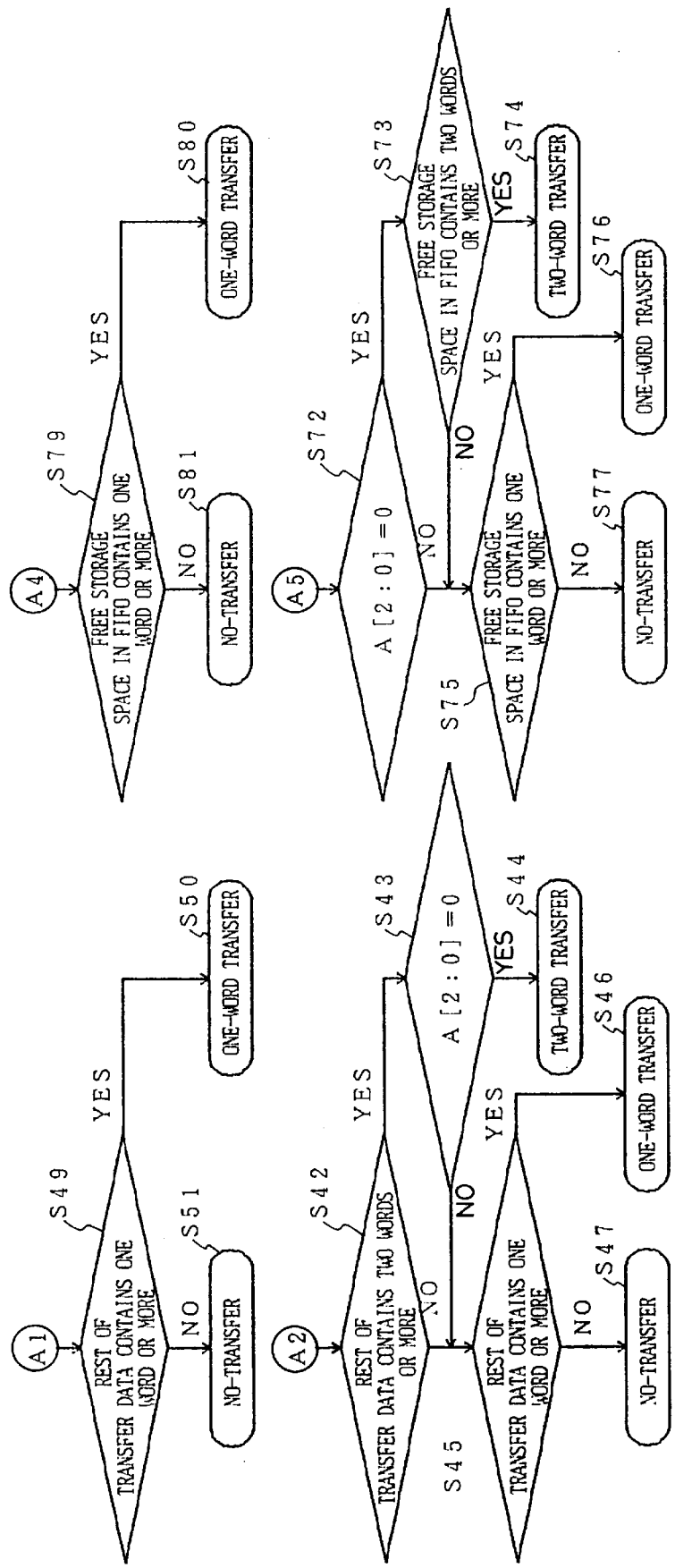
Figure 9:
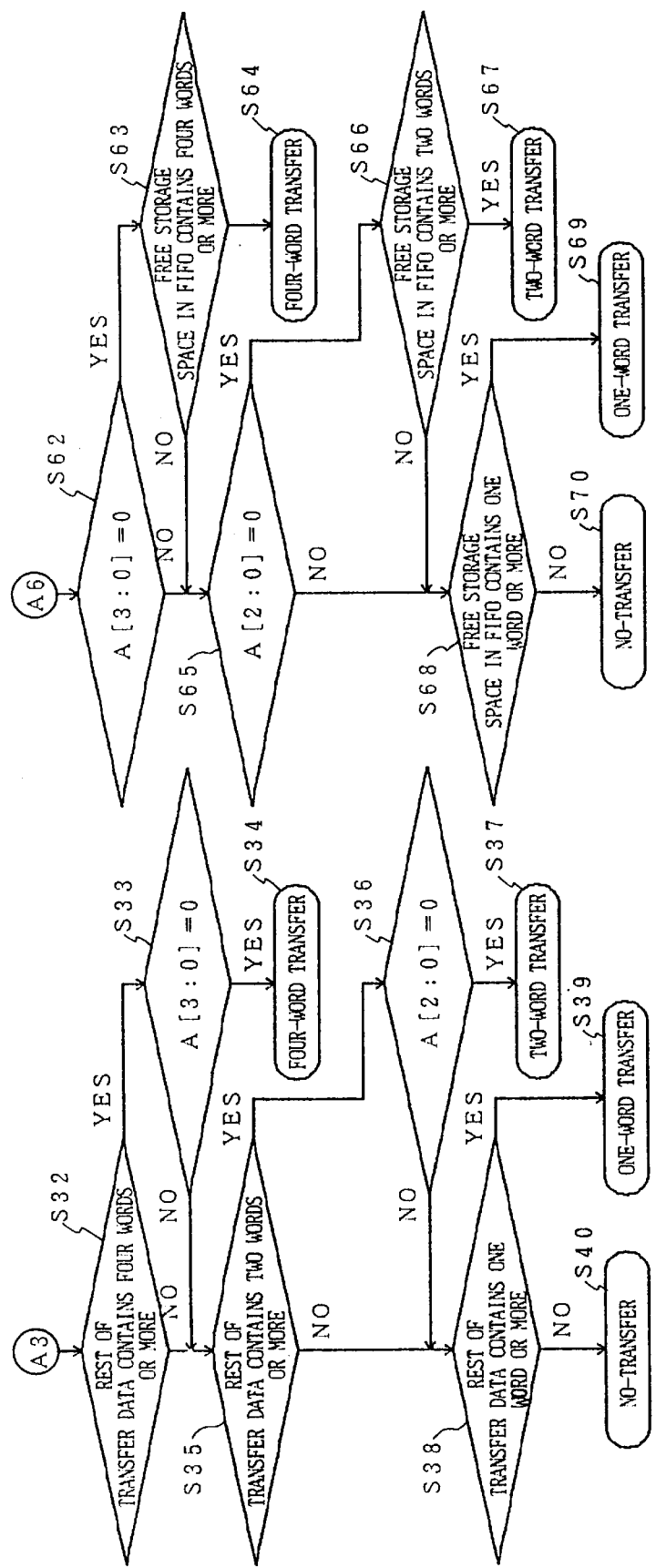

Note that A1 to A6 in FIGS. 7, 8 and 9 represent connecting terminals between respective flowcharts.

When the rest of transfer data in one block do not contain four words or more (NO) in step S32 and it is decided in step S33 that the transfer of four words is impossible (NO), a decision is made in step S35 as to whether or not the rest of transfer data in one block contain two words or more. In the case of two words or more, an address alignment check for the transfer of two words is made in step S36. That is, as described in connection with FIG. 3, a decision is made as to whether or not the three low-order bits of the access address are all 0s. When they are all 0s (YES), the transfer of two words is decided in step S37.

On the other hand, when it is decided in step S35 that the rest of transfer data in one block do not contain two words or more (NO) and it is decided in step S36 that the transfer of two words is impossible (NO), a decision is made in step S38 as to whether or not the rest of transfer data in the block contain one word or more. In the case of one word or more (YES), the transfer of one word is decided in step S39. Otherwise, "no transfer" is decided in step S40.

When it is decided in step S31 that the FIFO does not contain four words or more (NO), a decision is made in subsequent step S41 as to whether or not the FIFO contains two words or more. When the FIFO contains two words or more, exactly the same process as the process following step S35 is repeated from step S42, so that either the transfer of two words in step S44, the transfer of one word in step S46 or no transfer in step S47 is decided.

When it is decided in step S41 that data does not contain two words or more (NO), a decision is made in step S48 as to whether or not the FIFO contains one word or more. In the case of one word or more (YES), steps S49 to S51 which are the same as steps S38 to S40 are repeated, so that either one-word transfer or "no transfer" is decided. When it is decided in step S48 that the FIFO does not contain one word or more (NO), "no transfer" is decided in step S52.

When data output from the memory is decided in step S30, on the other hand, a decision is made in step S61 as to whether or not the rest of transfer data in one block contains four words or more, which is held by the transfer count register 26 in FIG. 6. In the case of four words or more, the address alignment is checked for four-word transfer. When the alignment is met, a decision is made in step S63 as to whether or not the output FIFO 24 in the output device 22 contains an amount of free space for four words or more. When the FIFO contains free storage space for four words or more, the transfer of four words is decided in step S64.

When the address alignment is not met (NO) in step S62 and the FIFO does not contain free space for four words or more in step S63 (NO), the address alignment is checked for two-word transfer in step S65. When the address alignment is met (YES), a decision is made in step S66 as to whether or not the FIFO contains two words or more. In the case of two words or more (YES), the two-word transfer is decided in step S67.

When the address alignment is not met (NO) in step S65 and the FIFO does not contain an amount of free space for two words or more (NO) in step S66, a decision is made in step S68 as to whether or not the FIFO contains one word or more. In the case of one word or more (YES), the one-word transfer is decided in step S69. When not one word or more (NOT), "no transfer" is decided in step S70.

When it is decided in step S61 that the rest of the transfer data does not contain four words or more (NO), a decision is made in step S71 as to whether or not the rest of the transfer data in one block contains two words or more. In the case of two words or more (YES), either two-word transfer, one-word transfer or no transfer is decided in steps S72 to S77 as in steps S65 to S70.

When it is decided in step S71 that the rest of the transfer data does not contain two words or more, a decision is made in step S78 as to whether or not the rest of the transfer data in the block contains one word or more. In the case of one word or more, either one-word transfer or no transfer is decided in steps S79 to S81 as in steps S68 to S70. Furthermore, when it is decided in step S78 that the rest of the transfer data does not contain one word or more, "no transfer" is decided in step S82.

Figure 10:
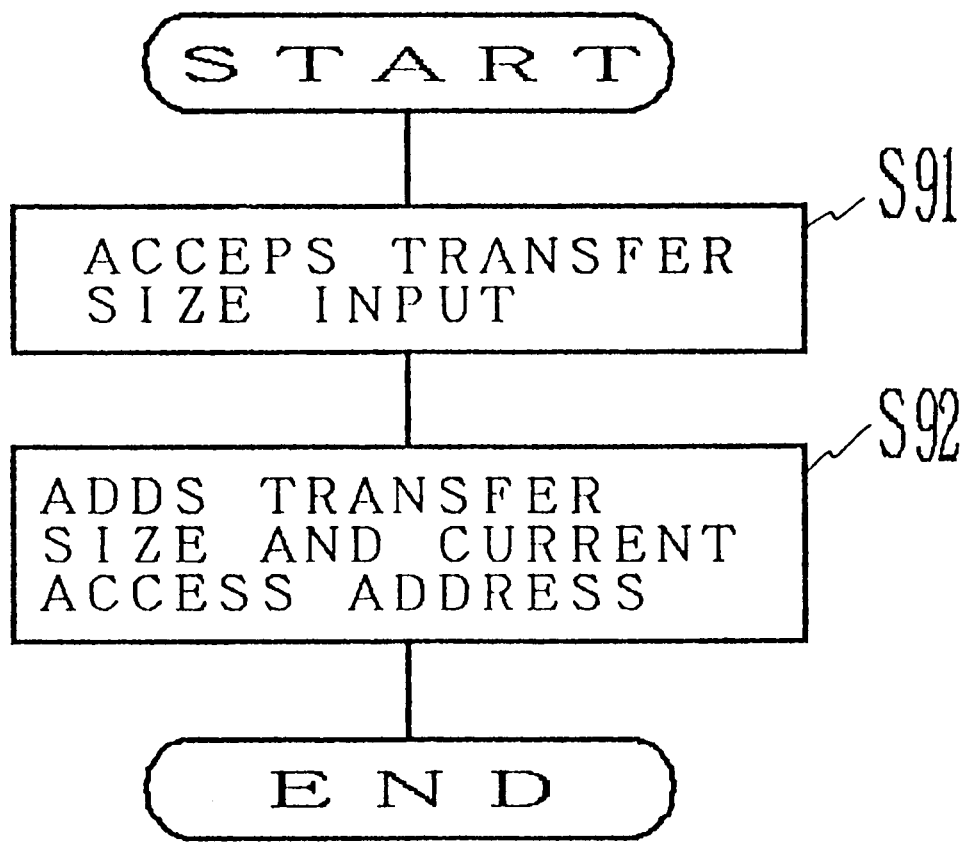
FIG. 10 is a flowchart of the operation of a next address decision logic circuit.

FIG. 10 is a flowchart of a process of deciding a next address by the next address decision logic 29 of FIG. 6. When the process is started, the logic accepts a transfer size input from the size register 27 in step S91 and adds the transfer size and the current address corresponding with the output of the address register 28 to yield the next address in step S92, thereby terminating the process.

Figure 11:
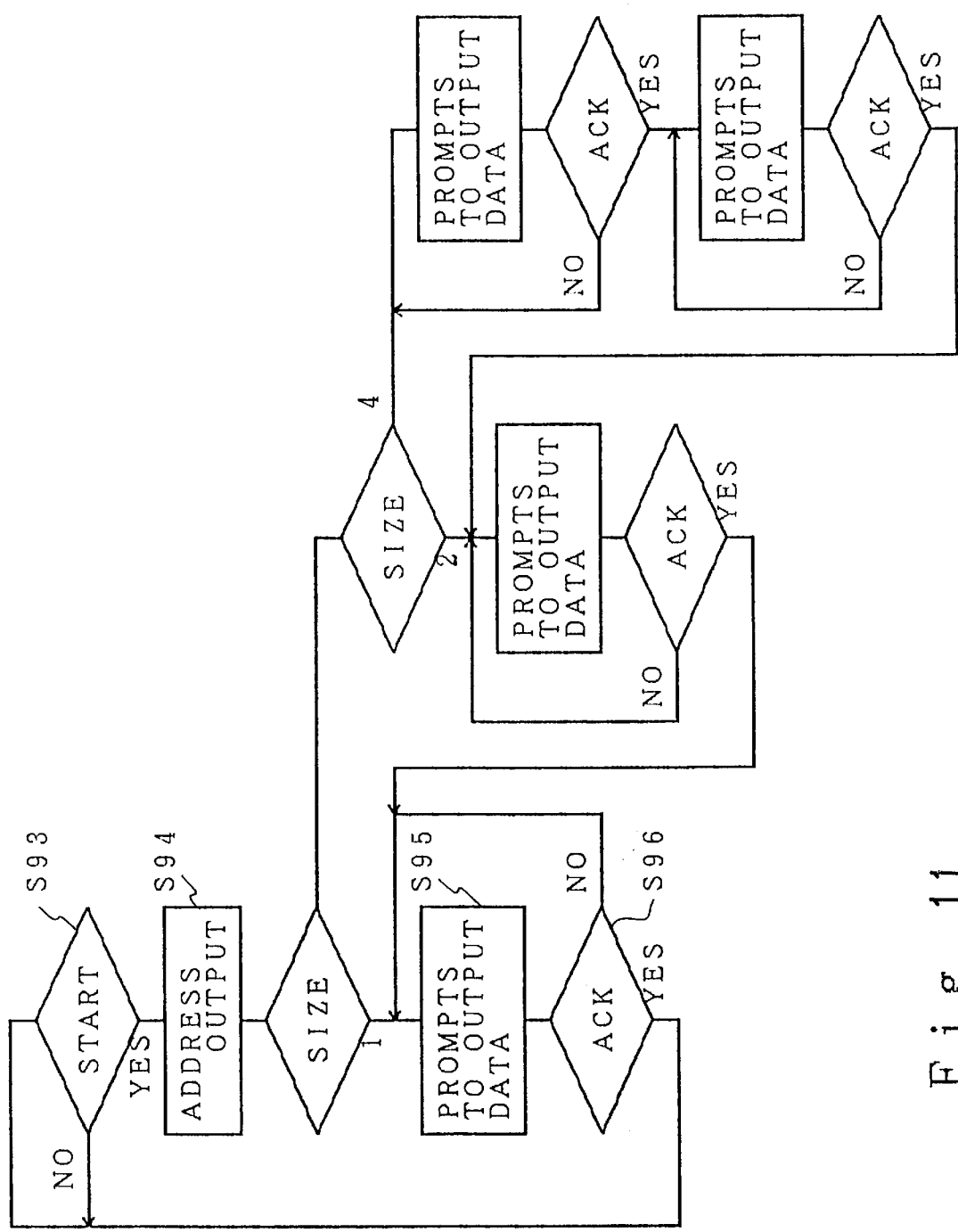
FIG. 11 is a flowchart of the operation of a bus read or write access sequencer.

FIG. 11 is a flowchart illustrating the operation of the bus access sequencer 31 of the direct memory access controller 25. The embodiment of the present invention relates to the direct transfer of data between the memory and input/output device. When starting the transfer of one word or a series of words (START: YES in step S93), the bus access sequencer 31 outputs an address first in step S94 and then prompts the memory or the input/output device to output data in step S95 if the transfer size is one word. In the case of four words or two words, data is output four times or two times and then the reception of ACK is verified. When data is transmitted from the memory to the output device, the memory is prompted to output data to the output device. In the case of transfer from the input device to the memory, the input device is prompted to output data to the memory. Following step S95, the reception of ACK is verified in step S95. When the ACK is not received, step S95 is repeated. The ACK, which will be described later, is output from the memory. There is a difference in the timing of outputting of the ACK between the input and the output.

Figure 12:
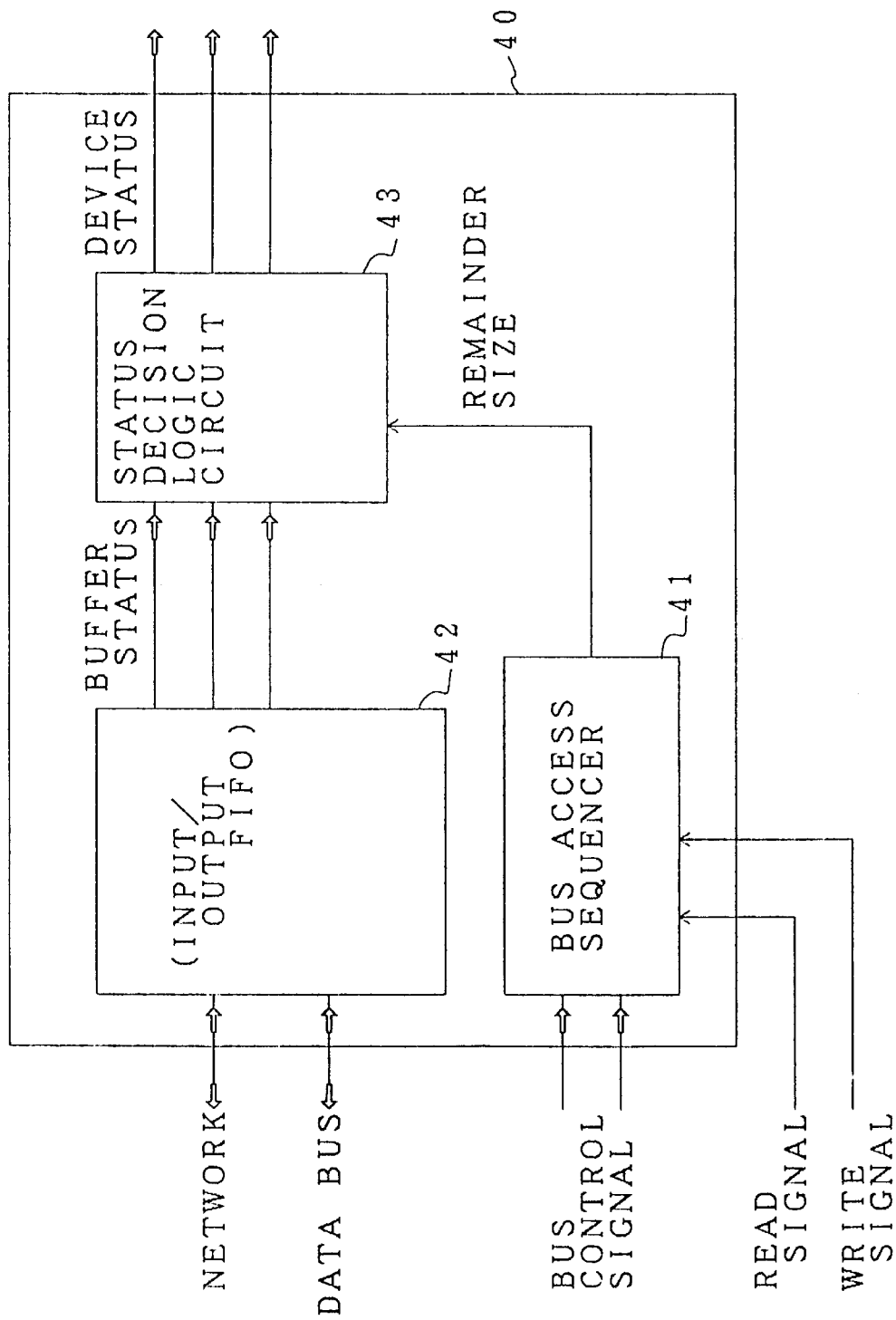
FIG. 12 is a block diagram of the input/output device.

FIG. 12 is a block diagram of the input/output device. A read signal and a write signal output from the direct memory access controller (DMAC) are applied to a bus access sequencer 41. Note that, although, in FIG. 5, the input device and the output device are provided separately, they are integrated into an input/output device in FIG. 12. When receiving a read signal or a write signal, the bus access sequencer 41 is responsive to a bus control signal to output data from a buffer (input/output FIFO) 42 onto the data bus or feed the contents on the data bus into the buffer 42. That is, the bus access sequencer identifies the data transfer size in bus access or in network access and outputs to a status representation decision logic circuit 43 how many words are left for subsequent transfer. The number of words for subsequent transfer is referred to as a remainder size, which assumes one of 4, 3, 2, 1 and 0.

Figure 13:
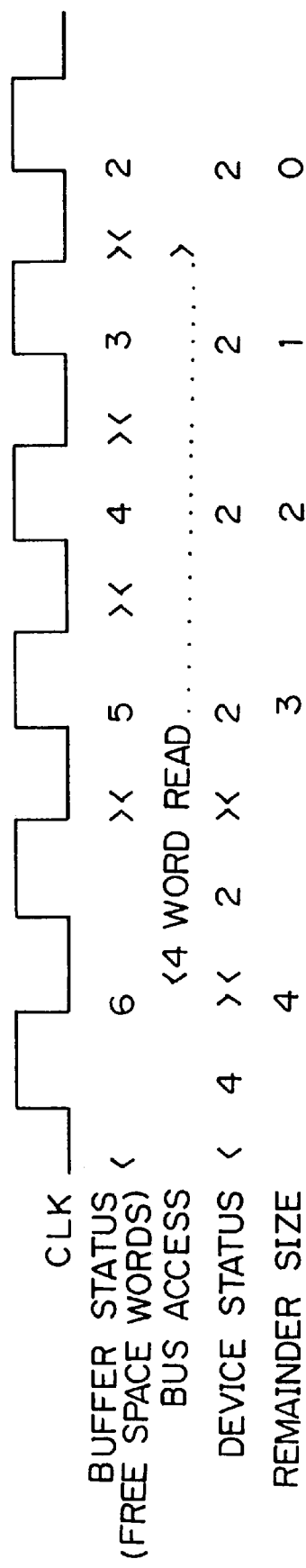
FIG. 13 is a timing chart for use in explanation of buffer status and device status of the output device.
Figure 14:
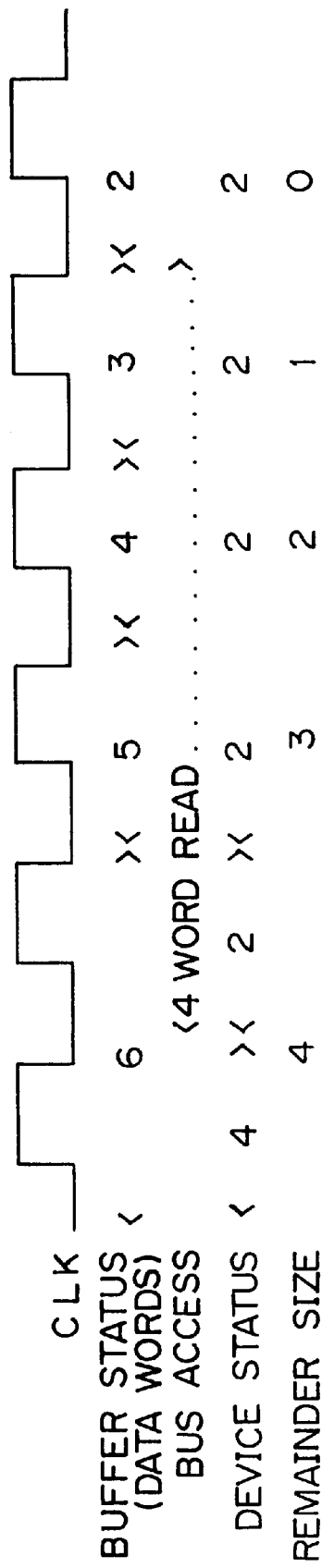
FIG. 14 is a timing chart for use in explanation of buffer status and device status of the input device.

FIGS. 13 and 14 are timing charts illustrating buffer status and device status. More specifically, FIG. 13 is a timing chart of the input/output device when it operates as an output device in which four words are written into the buffer when the buffer has free space for six words. FIG. 14 is a timing chart when the input/output device operates as an input device in which four words of six words are read. It is assumed that, in the Figures, reading and writing data require four cycles. The buffer status actually changes at the timing of inputting/outputting of data. A request signal is applied from the status representation decision logic circuit 43 to the direct memory access controller 25. At a point of time when a DMA operation corresponding to the request signal is started, the device status changes to the final status. This change permits the direct memory access controller 25 to decide next access in advance. Note that the status indicates the amount of free space in the case of the output device and the amount of data in the case of the input device.

The status representation decision logic circuit 43 is responsive to a network and bus access status signal from the bus access sequencer 41 to turn the buffer status representation off and output device buffer status through a request line.

Figure 15:
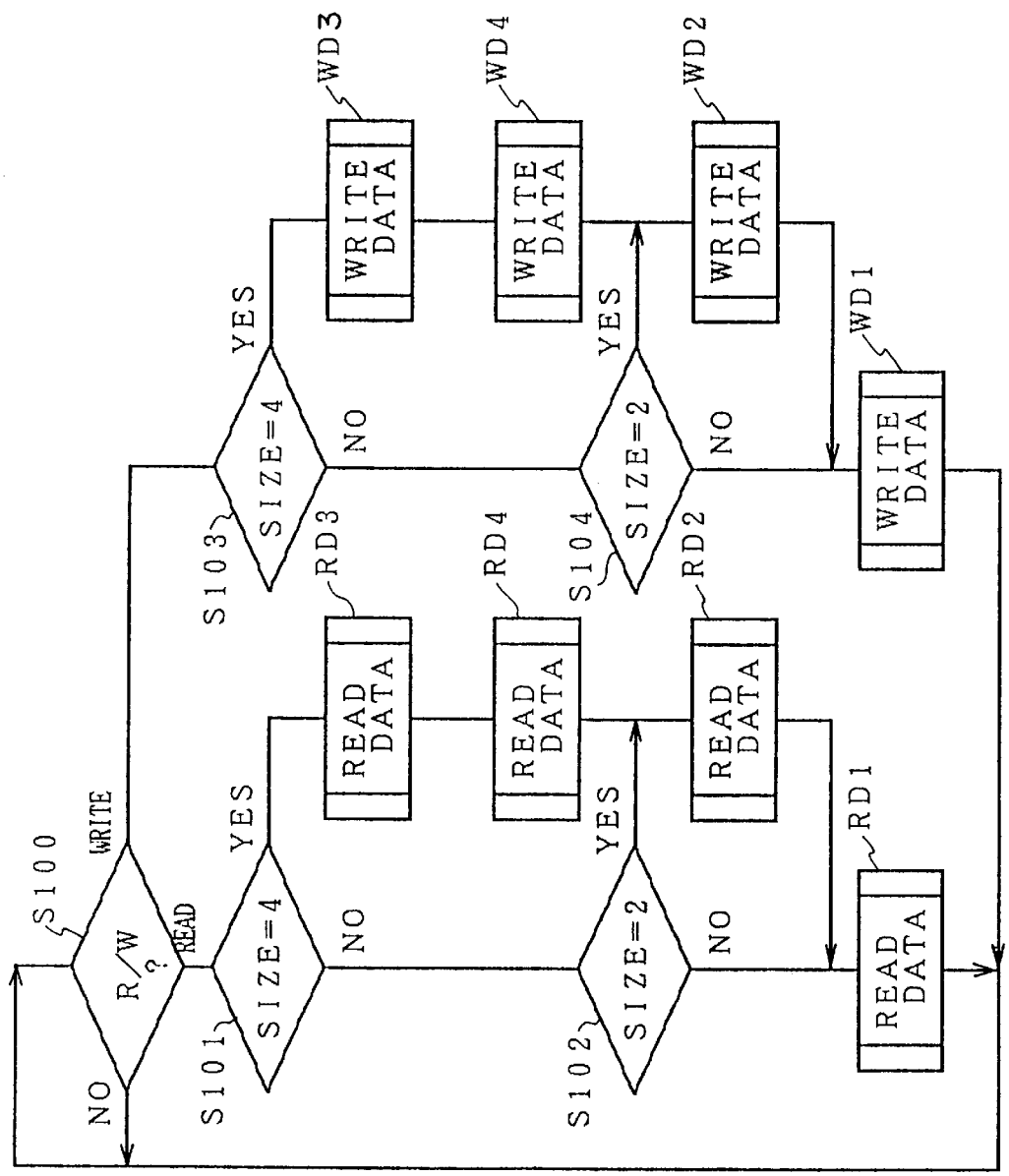
FIG. 15 is a flowchart of the operation of the bus access sequencer 41.
Figure 16:
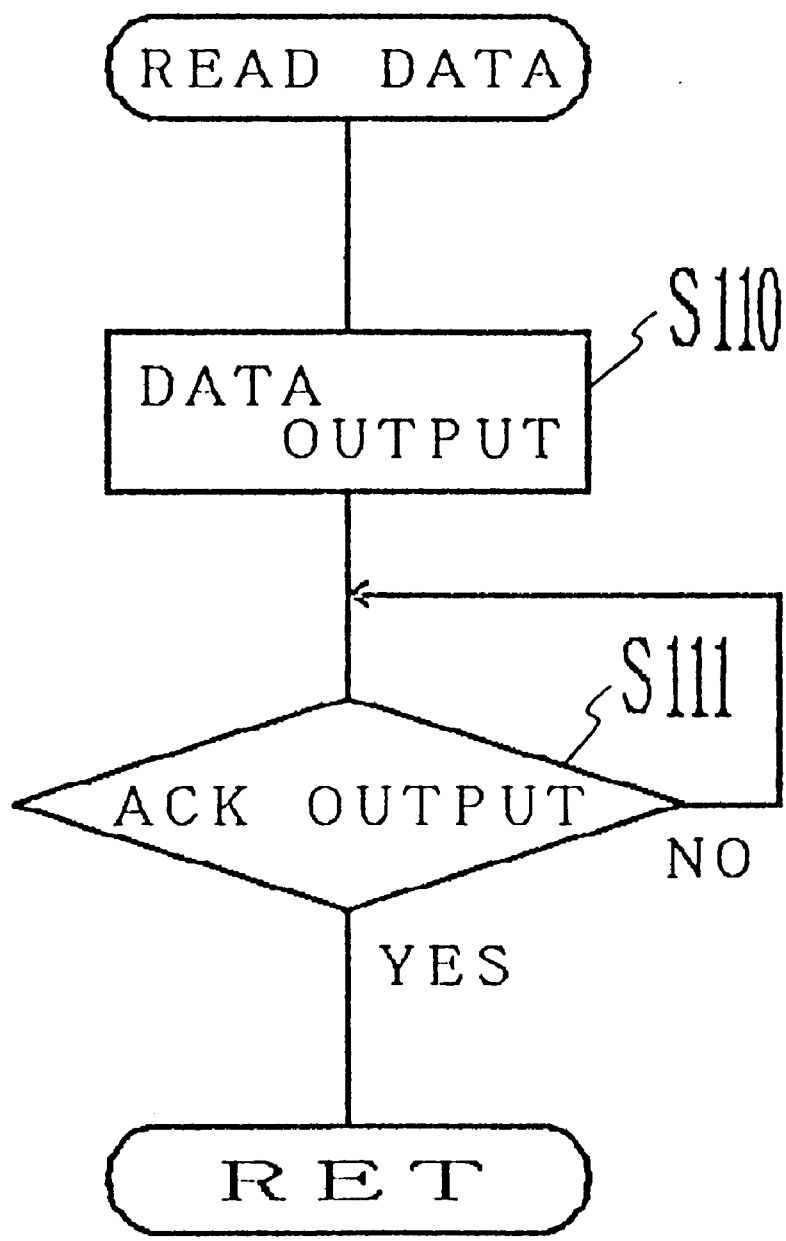
FIG. 16 is a flowchart of a reading process DATA.

FIG. 15 is a flowchart of the bus access sequencer 41 of the input/output device. A decision is made in step S100 as to whether or not there is an input or output instruction, or a read or write instruction from the direct access memory controller 25. This decision is repeated until the instruction is applied. When read is instructed (R), a decision is made in step S101 as to whether or not the data transfer size is four words. When the size is not four words (N), a decision is subsequently made in step S102 as to whether the size is two words or not. When the size is not two words, a process RDATA of reading one word is carried out. FIG. 16 is a flowchart of the read process RDATA. In the process RDATA, one word is output onto the bus in step S110 and then a decision is made in step S111 as to whether or not an ACK signal has been received from the memory. This decision is repeated until an ACK is detected. The process RDATA is terminated (RET) when the ACK is detected (Y).

When it is decided in step S102 in FIG. 15 that the data size is two words (Y), a reading process RDATA (RD2) is performed. Following the reading process RD2, the reading process RD1 is carried out, thereby reading a total of two words. When it is decided in step S101 that the size is four words, reading processes RD3, RD4, RD2 and RD1 are carried out. Each of the reading processes RD1 to RD4 is a process of transferring one word. Thus, a total of four words are transferred by the four reading processes RD3, RD4, RD2 and RD1.

On the other hand, when it is decided in step S100 that the write is instructed (W), a decision is made in step S103 as to whether or not the size of data to be written is four words. When the size is not four words (N), a subsequent decision is made in step S104 as to whether or not the data size is two words. When the size is not two words, a process WD1 of writing one word is carried out.

For example, when the data size is four words, the reading process RD3 is performed, so that the remainder size becomes three words. As a result of subsequent reading process RD4, the remainder size becomes two words. When reading processes RD2 and RD1 are performed in sequence, the remainder size becomes one word and then zero words.

Figure 17:
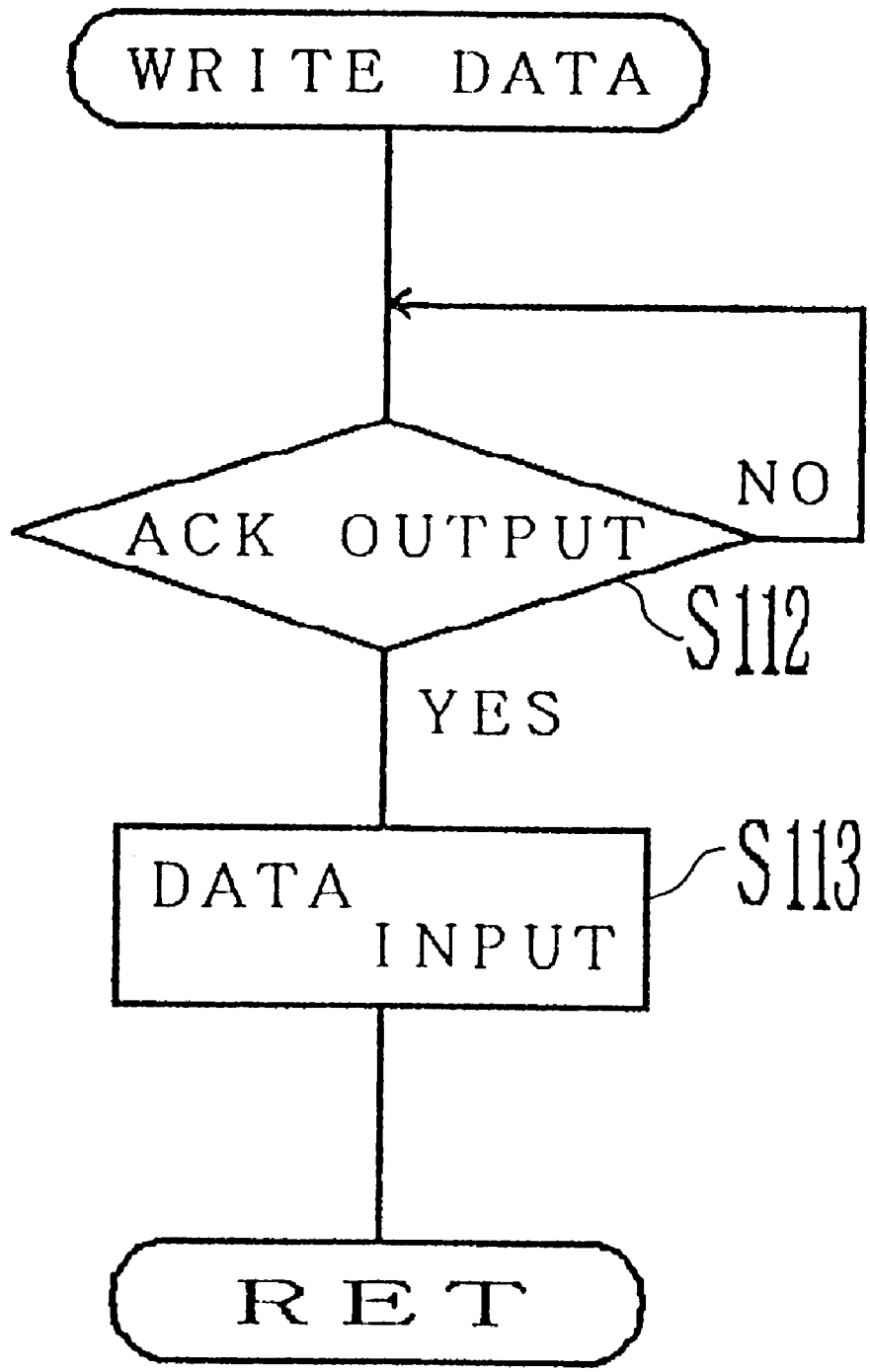
FIG. 17 is a flowchart of a one-word writing process.

FIG. 17 is a flowchart of the one-word writing process WDATA. When the writing process is started, a decision is made in step S112 as to whether an ACK has been output from the memory. This decision process is repeated until the ACK is output from the memory. When the ACK is output, entry of data is made in step S113, thereby terminating the writing process.

When, on the other hand, it is decided in step S104 that the data size is two words (Y), writing processes WD2 and WD1 are carried out in sequence. When it is decided in step S103 that the data size is four words (Y), writing processes WD3, WD4, WD2 and WD1 are carried out in sequence.

The operation is performed again from the decision step S100 on the termination of the reading process RD1 or the writing process WD1.

Figure 18:
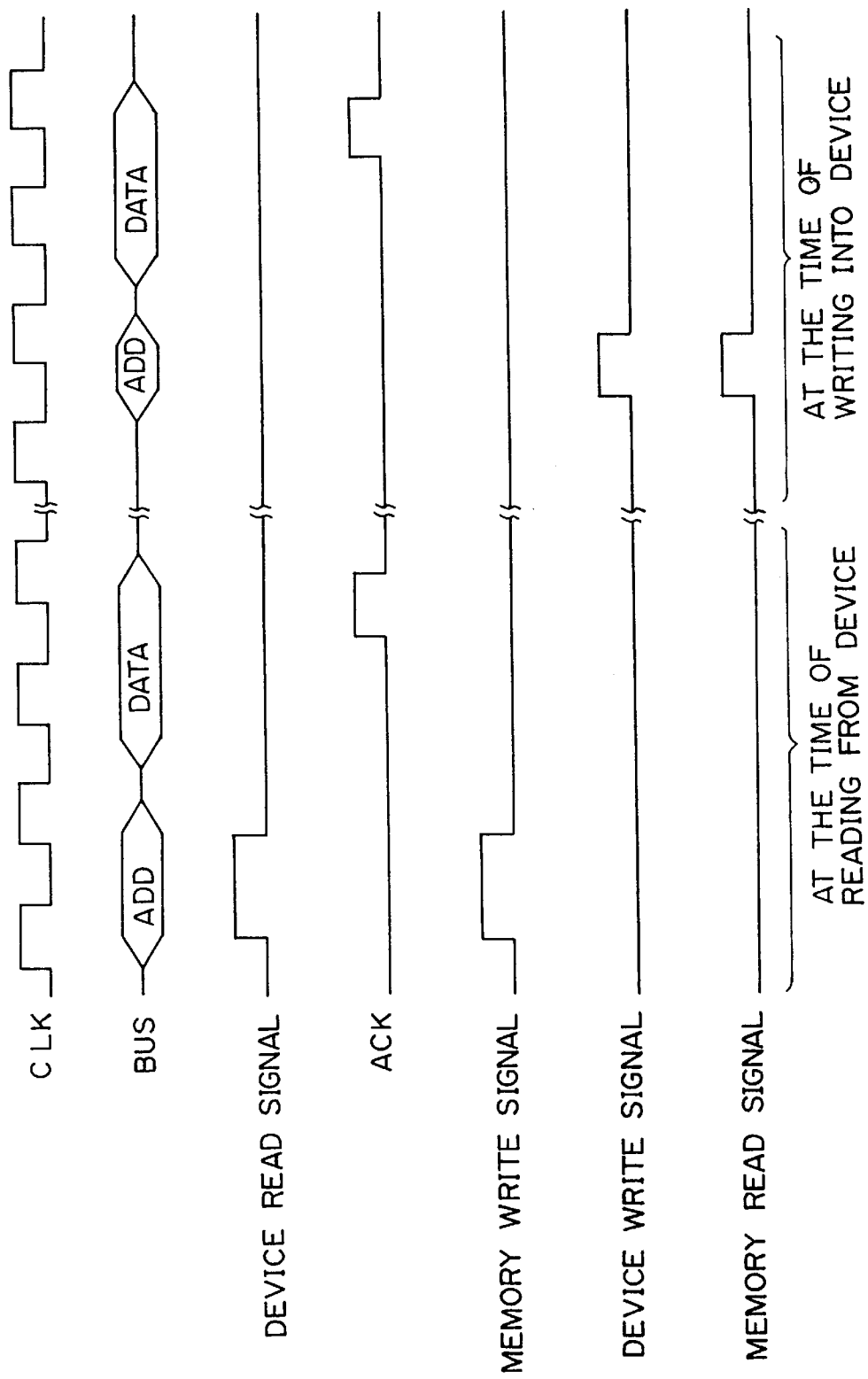
FIG. 18 is a device/memory access timing chart.

FIG. 18 is a timing chart of device memory access. At the time of reading from the device a device read signal and a memory write signal are output first, during which process an address on the bus is determined. When data is output onto the bus and an ACK is output from the memory, the transfer of one word terminates. At the time of writing into the device, on the other hand, a device write signal and a memory read signal are output, during which process an address is determined on the bus. The memory outputs data onto the bus and an ACK at the time of determination of the data.

In the above embodiment of the present invention, the amount of data to be transferred is determined in response to requests by the input/output device. The requests by the input/output device vary in sequence. For example, with an input/output device adapted to input and output data word by word, one word is transferred by one input/output operation, so that a request for one-word transfer is made upon the DMAC immediately after the termination of the input/output operation. If the DMAC did not respond to the request immediately, next one word would be transferred and a request for two words might be made. However, in such an input/output device for inputting/outputting a small number of words, particularly in an input/output device for inputting/outputting one word or less, a request signal is generated for a small number of words. Although the transfer of four words or more can improve efficiency in using the bus, if requests for one word are made sequentially, generally the DMAC responds to each of the requests. Thus, the above embodiment is advantageous to an input/output device adapted to transfer a large amount of data in a single transfer. If an amount of data to be transferred in a single transfer is small, the advantage will be reduced. Hereinafter a method of improving the efficiency in using the bus by the use of an input/output device adapted to input/output data in a unit of a small number of words, for example, in a one-word unit will be described in a second embodiment of the present invention. In the second embodiment, data transfer is placed in the wait state by a data transfer size decision logic circuit when the maximum transferable size calculated from the rest of data amount and the memory alignment corresponds with the amount of free space of the buffer in the device or the amount of data to be received.

That is, the transfer of four words and so on is performed after completion of a data transfer wait state, thereby minimizing the number of bus cycles required to transfer a series of words. For example, in the case of 10-word data transfer starting with four-word alignment, the first embodiment can transfer data in various ways such as four words+two words+two words, . . . , four words+one word+one word, . . . However, in the minimum bus cycle data is transferred in the form of four words+four words+two words. The second embodiment of the present invention is adapted for such minimization of bus cycles.

Figure 19:
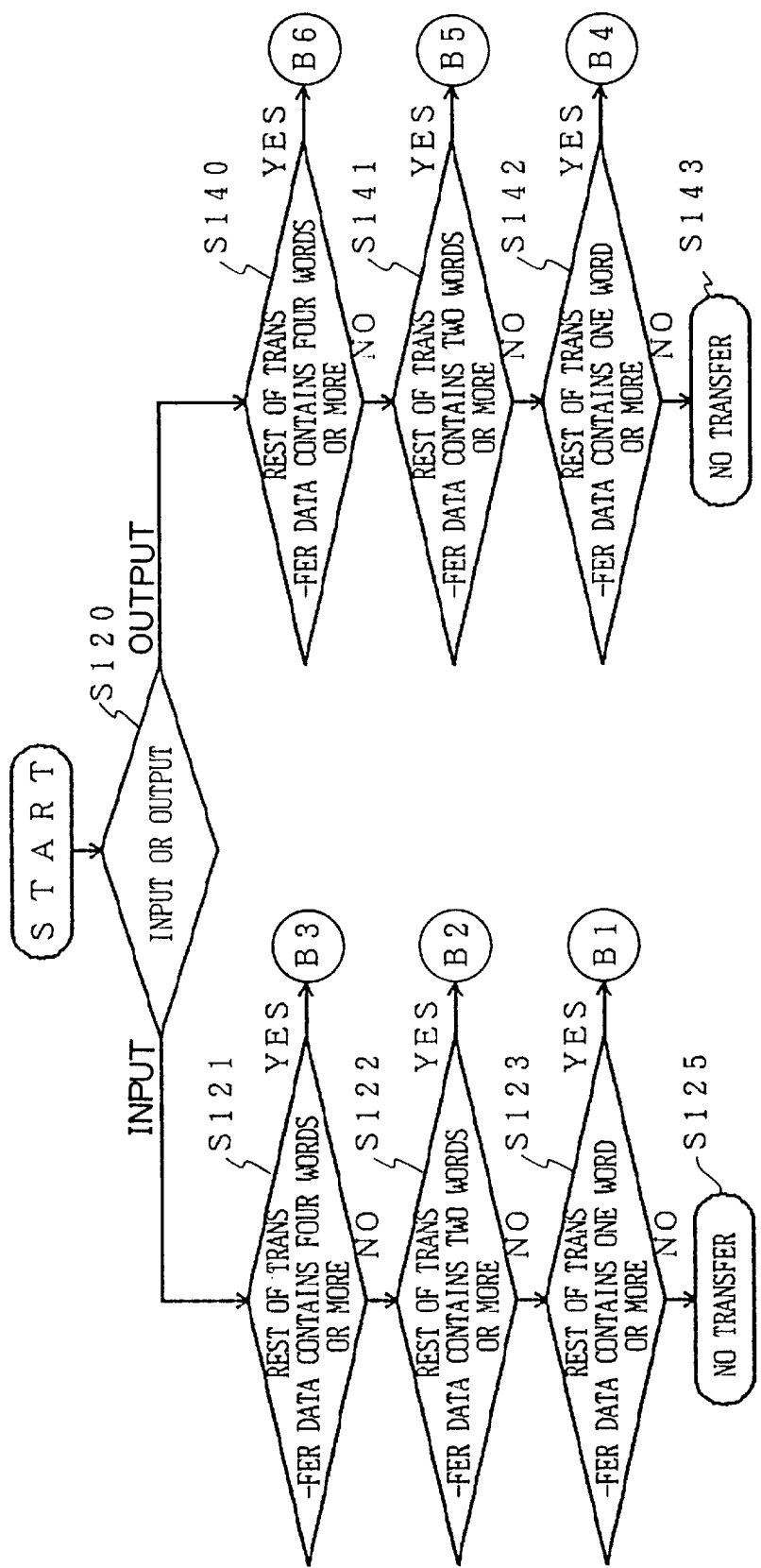
FIGS. 19, 20 and 21 are a flowchart of a process which decides the size of a data transfer unit and which is executed by the transmit size decision logic circuit 30 in the direct memory access controller (DMAC)
Figure 20:
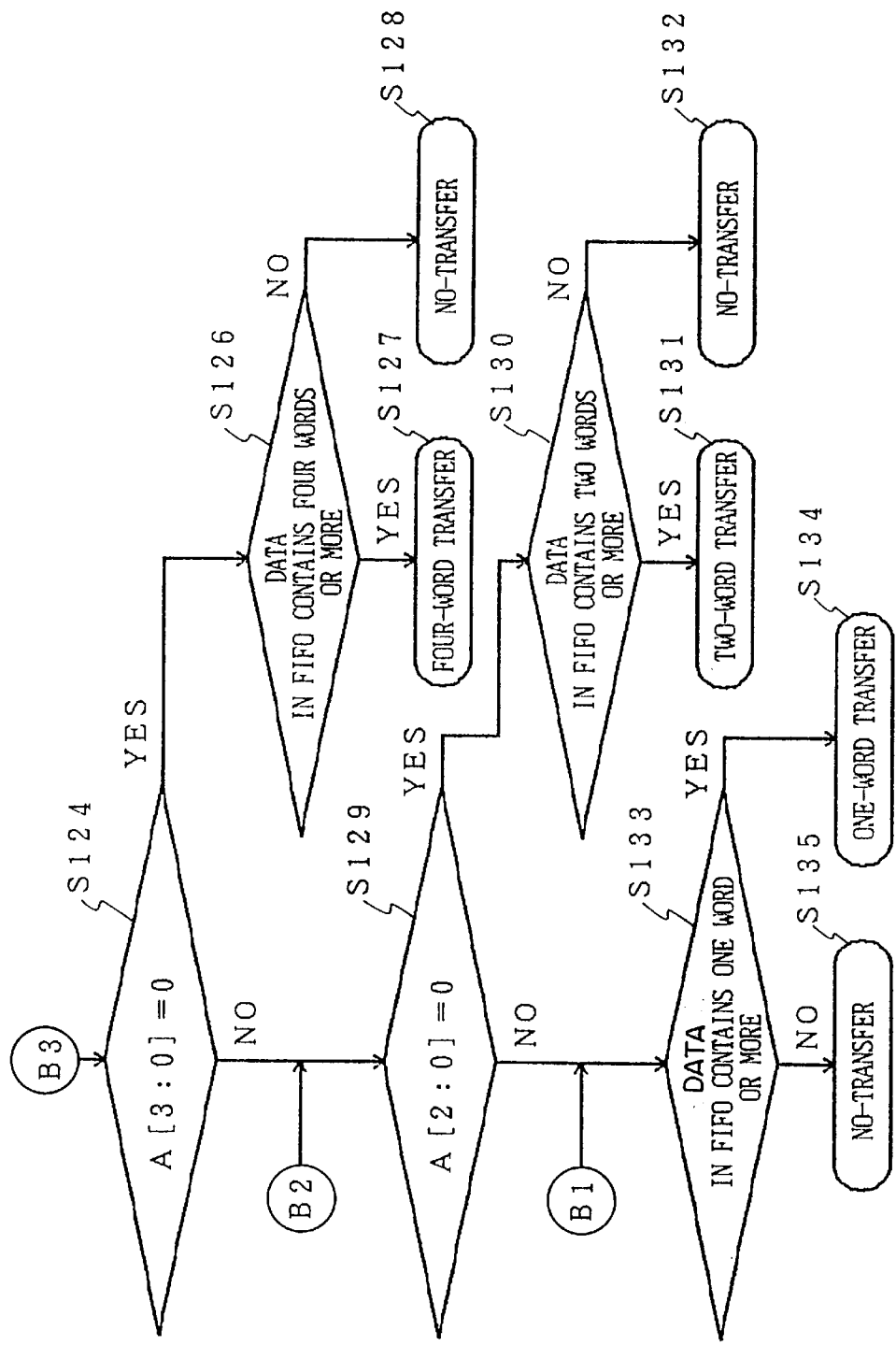
Figure 21:
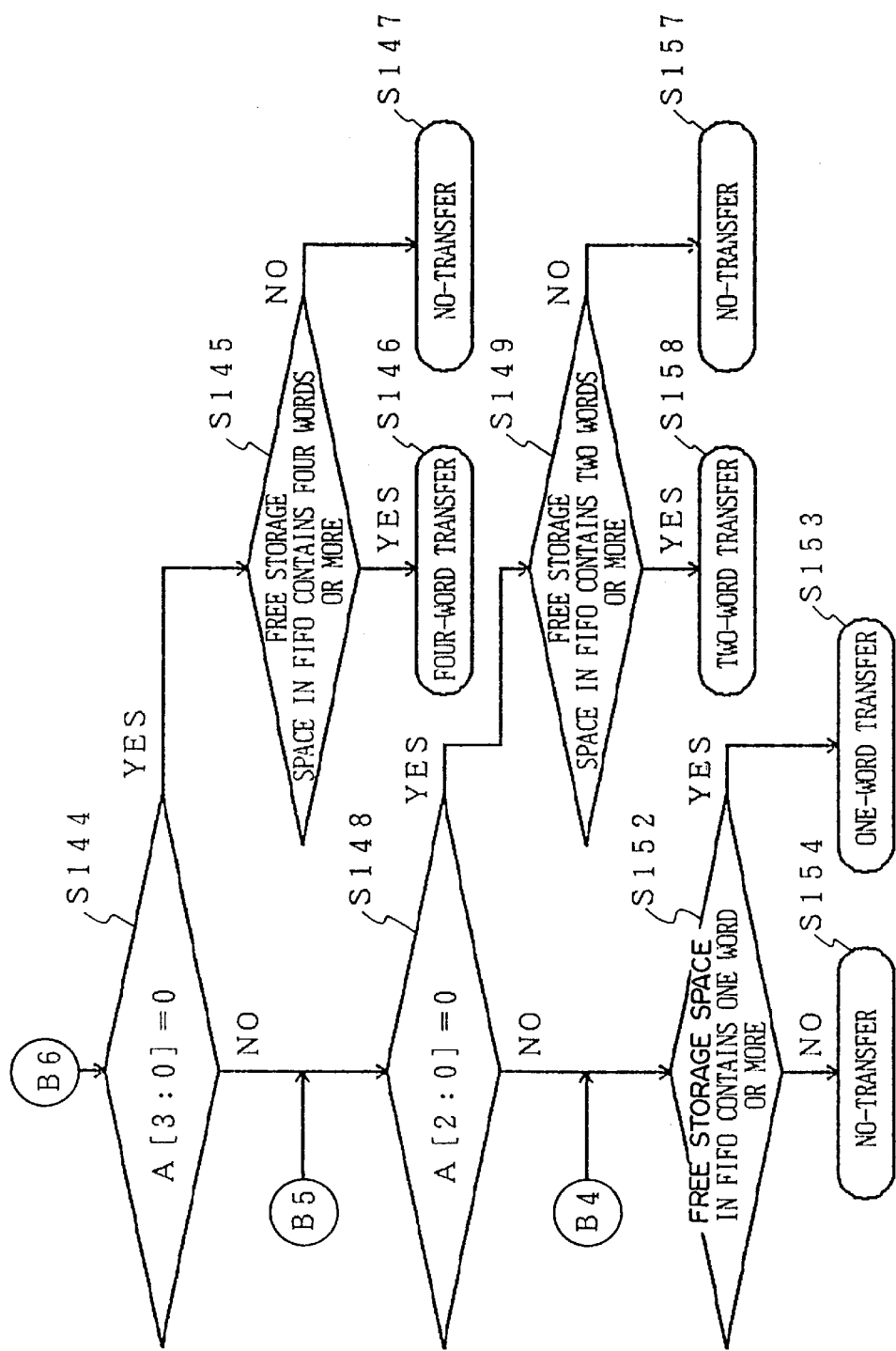

FIGS. 19, 20 and 21 are a flowchart of the process which decides the size of a data transfer unit and which is executed by the transfer size decision logic circuit 30 of the direct memory access controller (DMAC). B1 to B6 denote terminals each representing connection between processes. When a request for transfer is made, execution is started (START). First, a decision is made in step S120 as to proceed with either input or output. In the case of input, a decision is made in step S121 as to whether or not the rest of the transfer data contains four words or more. In the case of NO, a decision is made in step S122 as to whether or not the rest of the transfer data contains two words or more. In the case of NO, a decision is made in step S123 as to whether or not the rest of the transfer data contains one word or more. In the case of NO, "no transfer" is decided in step S125. In the case of YES in step S121, a decision is made in step S124 as to whether or not the four low-order bits of an address are all zeros. When they are all zeros (YES), a decision is subsequently made as to whether or not the FIFO contains four words or more. When four words or more remains in the FIFO (YES), four words are transferred in step S127. When there are not four words or more in the FIFO (NO), "no transfer" is decided in step S128. When the four low-order bits of the address are 0s (YES) in step S124, a decision is made in step S129 as to whether or not the three low-order bits of the address are all 0s. When the three low-order bits of the address are 0s (YES), a decision is made in step S130 as to whether or not the FIFO contains two words or more. In the case of two words or more (YES), the two-word transfer is decided in step S131. When not two words or more (NO), "no transfer" is decided in step S132. When the three low-order bits of the address are not 0s (NO), a decision is made in step S133 as to whether or not the FIFO contains one word or more. When one word or more, "one-word transfer" is determined in step S134, while if not one word or more, "no transfer" is determined in step S135.

If it is decided in step S122 that the rest of the transfer data contains two words or more (YES), then step S129 is executed, while if it is decided in step S123 that the rest of the transfer data contains one word or more, then step S133 is executed.

The determination of "no transfer" in step S125 corresponds to the case where no transfer data is left. In other cases, even if transfer data is left, it is determined that it is not transferred. This is performed to set the boundary of words for the remaining transfer data.

Although the above is the case of data input to the input/output device, the case of data output from the input/output device is similar to the case of data input. When it is output in step S120, a decision is made in step S140 as to whether or not the rest of the transfer data contains four words or more. When not four words or more (NO), a decision is made in step S141 as to whether or not the rest of the transfer data contains two words or more. When not two words or more, a decision is made in step S142 as to whether or not the rest of the transfer data contains one word or more. When not one word or more, "no transfer" is decided in step S143. When the rest of the transfer data contains four words or more in step S142, a decision is made in step S144 as to whether or not the four low-order bits of the address are all 0s. When they are all 0s (YES), a decision is made in step S145 as to whether or not the FIFO contains an amount of free space of four words or more. When there is free space for four words or more, the transfer of four words is determined in step S146. When there is no free space of four words (NO), "no transfer" is determined in step S147. In the present embodiment, even if four words or more are left for transfer, when the amount of free space of the FIFO is less than four words, no transfer is performed. When free space for four words is present, a transfer request signal is applied again. At this time, the transfer of four words is determined in step S146. Since a transfer request is output for each of four words, two words and one word as described in connection with FIG. 5, the above processes are possible. On the other hand, when it is decided in step S144 that the four low-order bits of the address are not all 0s (NO), a decision is subsequently made in step S148 as to whether or not the three low-order bits of the address are 0s. When they are all 0s, a decision is made as to whether or not the FIFO contains free space of two words or more. When two words or more, the transfer of two words or more is determined in step S150. When not two words or more, "no transfer" is determined in step S151. When the three low-order bits of the address are not all 0s (NO) in step S148, a decision is made in step S152 as to whether or not the amount of free space of the FIFO is one word or more. When one word or more (YES), one-word transfer is determined in step S153. When there is no free space for one word or more (NO), "no transfer" is determined in step S154. When the FIFO has free space for two words or more in step S141, step S148 is executed, while, when one word or more in step S142, step S152 is executed.

In the case of data output, as is the case with data input, each of transfers of four words or more, two words or more and one word or more is performed at a word boundary.

As described above, the transfer size decision logic circuit 30 decides the number of transfer words and outputs it to the size register 27.

The status of the input/output device, as shown in FIG. 22, is determined by the buffer status (in FIG. 22, the buffer has a capacity of eight words, and the input device and the output device respectively output the number of stored words and the number of words of free space as the buffer status, digits within parentheses indicate the device status representation) and the remainder transfer size. For example, in the case of FIGS. 13 and 14, when the transfer of four words is initiated at the time of six-word buffer status, the remainder size transferred by this transfer is four words if data transfer is not performed. Thus, the output of the decision logic for deciding the device status at this time becomes two. When one word is transferred, the remainder size transferred by this transfer is three words and the buffer status is five. In this case as well, the decision logic is arranged so that the device status becomes two. As described above, the next status can be obtained prior to data transfer by designing the status decision logic circuit 43 such that, when access to the device is initiated, the status when the access is terminated is obtained from the buffer status and the remainder size. This will enable pipeline processing.

The present invention is not limited to one-, two- and four-word boundaries in the above-described embodiments and other word boundaries may be employed.

As described above in detail, according to the present invention, it becomes possible to execute direct memory access with an input device having an input buffer (FIFO), in efficient bus transfer cycles, and direct memory access with an output device having an output buffer (FIFO), in a minimum of bus transfer cycles, without taking address alignment and size of transfer data into account previously. This significantly contributes to an increase of the speed and efficiency of data input/output in a computer system.

What is claimed is:

1. A data transfer system for maximizing a data transfer rate, for use with a single address direct memory access system for direct data transfer between a memory and an input/output device, comprising:

a memory having a plurality of access addresses each for storing input data;

an input device, connected to said memory by a common bus and including a FIFO buffer of a first-in-first-out memory for storing said input data, to transfer said stored input data to said memory on said common bus and to output a remaining amount of said input data stored in said FIFO buffer; and memory write control means, connected to said memory and to said input device, for receiving said remaining amount of said input data output by said input device, for determining whether a data transfer is required each time said input data is stored in said FIFO buffer and if said data transfer is determined to be required, for determining an access size of said input data transferred to one of said plurality of access addresses in said memory in accordance with said received remaining amount of said input data and said one access address in said memory for a single address direct memory access by a direct memory access controller (DMAC) not having a buffer, said access size being at least one word, and for controlling said input device to transfer said stored input data having said determined access size to said one access address in said memory.

2. The system according to claim 1, wherein said FIFO buffer of said first-in-first-out memory, located in said input device, reads one word which is a minimum unit of memory access, two words and four words.

3. The system according to claim 1, wherein said input device has a plurality of output lines for outputting said input data according to said total amount of said input data stored in said FIFO buffer.

4. The system according to claim 1, wherein said memory write control means comprises:

a transfer count register for holding a portion of said total amount of said input data which remains untransferred to said memory;

a size register for outputting said determined data transfer size;

an address register for outputting a memory access address;

a next address decision logic for adding said determined data transfer size output from said size register and an output of said address register and thereby determining a next memory access address in said memory; and a transfer size decision logic means for deciding said data transfer size in accordance with said portion held by said transfer count register, said total amount of said input data from said input device and an output of said next address decision logic and for outputting said decided data transfer size to said size register.

5. The system according to claim 4, wherein said input data includes a plurality of data units and said transfer size decision logic means decides:

a number of said plurality of data units;

whether or not said portion of said total amount of said input data remaining untransferred held by said transfer count register is said number of data units or more;

if said portion is said number of data units or more, whether or not data transfer in said number of data units is possible in accordance with an output of said next address decision logic;

if data transfer in said number of data units or more is possible, said number of data units is a data transfer size;

if data transfer in said number of data units or more is not possible and said portion is not said number of data units or more, said transfer size decision logic means repeats its functions, using a number of units which is smaller by one step than said number of data units until a determination of a data transfer size which includes no transfer of data is achieved.

6. A data transfer system for maximizing a data transfer rate, for use with a single address direct memory access system for direct data transfer between a memory and an input/output device, comprising:

a memory having a plurality of access addresses each for storing output data;

an output device, connected to said memory by a common bus, including a FIFO buffer of a first-in-first-out memory to store said output data transferred from said memory on said common bus, and to output a remaining amount of free space in said FIFO buffer; and memory read control means, connected to said memory and to said output device, for receiving said remaining amount of free space in said FIFO buffer output by said output device, for determining whether a data transfer is required each time said output data is output to said FIFO buffer and if said data transfer is determined to be required, for determining an access size of said output data transferred from one of said plurality of access addresses in said memory in accordance with said received remaining amount of free space in said FIFO buffer and said one access address in said memory for a single address direct memory access by a direct memory access controller (DMAC) not having a buffer, said access size being at least one word, and for controlling said one access address of said memory to transfer said output data having said determined access size to said output device.

7. The system according to claim 6, wherein said FIFO buffer of said first-in-first out memory, located in said output device, reads one word, which is a minimum unit of memory access, two words and four words.

8. The system according to claim 6, wherein said output device has a plurality of output lines for outputting corresponding amounts of said free space in said FIFO buffer, said plurality of output lines being connected to said memory read control means.

9. The system according to claim 6, wherein said memory read control means comprises:

a transfer count register for holding a portion of said total amount of said output data which remains untransferred to said FIFO buffer;

a size register for outputting said determined data transfer size;

an address register for outputting a memory access address;

a next address decision logic circuit for adding said determined data transfer size output from said size register and an output of said address register and thereby determining a next memory access address in said memory; and a transfer size decision logic means for deciding said data transfer size in accordance with said portion held by said transfer count register, said total amount of said free space in said FIFO buffer and an output of said next address decision logic and for outputting said decided data transfer size to said size register.

10. The system according to claim 9, wherein said output data includes a plurality of data units and said transfer size decision logic means decides:

a number of said plurality of data units;

whether or not said portion of said total amount of said output data remaining untransferred to said FIFO buffer and held by said transfer count register is said number of data units;

in accordance with said number of data units and an output of said next address decision logic circuit, whether or not access to data in said number of data units is possible;

if access to data is possible, whether or not the amount of free space of said FIFO buffer is said number of data units or more;

if said amount of free space is said number of data units or more, said number of data units is a data transfer size; and if access to data is not possible and said amount of free space is not said number of data units or more, said transfer size decision logic means repeats its functions using a number of data units which is smaller by one step than said number of data units until a determination of a data transfer size which includes no transfer of data is achieved.

11. A data transfer system for maximizing a data transfer rate, for use with a single address direct memory access system for direct data transfer between a memory and an input/output device, comprising:

a memory having a plurality of access addresses each for storing input data;

an input device, connected to said memory by a common bus and including a FIFO buffer of a first-in-first-out memory for storing said input data, to transfer said stored input data to said memory on said common bus and to output a remaining amount of said input data stored in said FIFO buffer; and memory write control means, connected to said memory and to said input device, for receiving said remaining amount of said input data output by said input device, for determining whether a data transfer is required each time said input data is stored in said FIFO buffer and if said data transfer is determined to be required, for determining an access size of said input data transferred to one of said plurality of access addresses in said memory in accordance with said received remaining amount of said input data, said one access address in said memory for a single address direct memory access by a direct memory address controller (DMAC) not having a buffer and a remaining amount of said transfer data, and for controlling said input device to transfer said stored input data having said determined access size to said one access address in said memory.

12. The system according to claim 11, wherein said FIFO buffer of said first-in-first-out memory, located in said input device, reads one word which is a minimum unit of memory access, two of words and four words.

13. The system according to claim 11, wherein said input device has a plurality of output lines for outputting stored amounts of input data stored in said FIFO buffer, said output lines being connected to said memory write control means.

14. The system according to claim 11, wherein said memory write control means comprises:

a transfer count register for holding a portion of said total amount of said input data which remains untransferred to said FIFO buffer;

a size register for outputting said determined data transfer size;

an address register for outputting a memory access address;

a next address decision logic circuit for adding said determined transfer size output from said size register and an output of said address register to thereby determine a next memory access address in said memory; and a transfer size decision logic means for deciding said data transfer size in accordance with said portion held by said transfer count register, said total amount of said input data from said input device and an output of said next address decision logic and for outputting said decided transfer size to said size register.

15. The system according to claim 14, wherein said input data includes a plurality of data units and said transfer size decision logic means decides:

a number of said plurality of data units;

whether or not said portion of said total amount of said input data remaining untransferred held by said transfer count register is said number of data units;

whether or not the transfer of said number of data units is possible;

if data transfer is possible, whether or not said number of data units is present in said FIFO buffer;

if said number of units is present in said FIFO buffer, said number of data units is a data transfer size if said number of units is not present in said FIFO buffer and data transfer is not possible, whether or not data transfer is possible in a number of units lower than said number of data units.

16. A data transfer system for maximizing a data transfer rate, for use in a single address direct memory access system for direct data transfer between a memory and an input/output device, comprising:

a memory having a plurality of access addresses each for storing output data;

an output device, connected to said memory by a common bus, including a FIFO buffer of a first-in-first-out memory to store said output data transferred from said memory on said common bus, and to output a remaining amount of free space in said FIFO buffer; and memory read control means, connected to said memory and to said output device, for receiving said remaining amount of free space in said FIFO buffer output by said output device, for determining whether a data transfer is required each time said output data is output to said FIFO buffer and if said data transfer is determined to be required, for determining an access size of said output data transferred from one of said plurality of access addresses in said memory in accordance with said received remaining amount of free space in said FIFO buffer, said one access address in said memory for a single address direct memory access by a direct memory access controller (DMAC) not having a buffer, and a remaining amount of said transfer data, and for controlling said one access address of said memory to transfer said output data having said determined access size to said output device.

17. The system according to claim 16, wherein said FIFO buffer of said first-in-first-out memory, located in said output device, reads one word which is a minimum unit of memory access, two words and four words.

18. The system according to claim 16, wherein said output device has a plurality of output lines for outputting corresponding amounts of free space in said FIFO buffer, said output lines being connected to said memory read control means.

19. The system according to claim 16, wherein said memory read control means comprises:

a transfer count register for holding a portion of said total amount of said output data which remains untransferred to said FIFO buffer;

a size register for outputting said determined data transfer size;

an address register for outputting a memory access address;

a next address decision logic for adding said determined data transfer size output from said size register and an output of said address register and thereby determining a next memory access address in said memory; and a transfer size decision logic means for deciding said data transfer size in accordance with said portion held by said transfer count register, said total amount of said free space in said FIFO buffer, and an output of said next address decision logic and for outputting said decided data transfer size to said size register.

20. The system according to claim 19, wherein said output data includes a plurality of data units and said transfer size decision logic means decides:

a number of said plurality of data units;

whether or not said portion of said total amount of said output data remaining untransferred held by said transfer count register is said number of data units;

whether or not the transfer of said number of data units is possible;

if data transfer is possible, whether or not said number of data units can be stored in said FIFO buffer;

if said number of data units can be stored in said FIFO buffer, said number of data units is a data transfer size if data transfer is not possible and said number of data units cannot be stored in said FIFO buffer, whether or not data transfer is possible in a number of data units lower than said number of data units.

21. A data transfer method for maximizing a data transfer rate, for use with a single address direct memory access system for direct data transfer between a memory and an input/output device, comprising the steps of:

(a) determining whether or not data stored in an input FIFO includes at least four words;

(b) determining whether or not data stored in said input FIFO includes at least two words; and (c) determining whether or not data stored in said input FIFO includes at least one word.

22. The method according to claim 21, further comprising the steps of, when said step (a) determines that data stored in said input FIFO includes at least four words:

(d) determining whether or not a rest of transfer data in one block includes at least four words;

(e) determining whether or not a rest of transfer data in said one block includes at least two words; and (f) determining whether or not a rest of transfer data in said one block includes at least one word.

23. The method according to claim 21, further comprising the steps of, when said step (b) determines that data stored in said input FIFO includes at least two words:

(d) determining whether or not a rest of transfer data in one block includes at least two words; and (e) determining whether or not a rest of transfer data in said one block includes at least one word.

24. The method according to claim 21, further comprising the step of (d) determining whether or not a rest of transfer data in one block includes at least one word, when said step (c) determines that data stored in said input FIFO includes at least one word.

25. A data transfer method for maximizing a data transfer rate, for use with a single address direct memory access system for direct data transfer between a memory and an input/output device, comprising the steps of:

(a) determining whether or not data stored in an output FIFO includes at least four words;

(b) determining whether or not data stored in said output FIFO includes at least two words; and (c) determining whether or not data stored in said output FIFO includes at least one word.

26. The method according to claim 25, further comprising the steps of, when said step (a) determines that data stored in said output FIFO includes at least four words:

(d) determining whether or not said output FIFO includes an amount of free space for at least four words;

(e) determining whether or not said output FIFO includes an amount of free space for at least two words; and (f) determining whether or not said output FIFO includes an amount of free space for at least one word.

27. The method according to claim 25, further comprising the steps of, when said step (b) determines that data stored in said output FIFO includes at least two words:

(d) determining whether or not said output FIFO includes an amount of free space for at least two words; and (e) determining whether or not said output FIFO includes an amount of free space for at least one word.

28. The method according to claim 25, further comprising the step (d) determining whether or not said output FIFO includes an amount of free space for at least one word, when said step (c) determines that data stored in said output FIFO includes at least one word.

* * * * *